US010854027B1

(12) United States Patent
Lucks et al.

(10) Patent No.: US 10,854,027 B1
(45) Date of Patent: Dec. 1, 2020

(54) PASS-BASED SYSTEM AND METHOD FOR RESIDENT-MANAGED ENTRY OF GUEST VEHICLES TO A GUARD-MONITORED GATED COMMUNITY

(71) Applicants: Adam Lucks, Parkland, FL (US); Philip Lucks, Boynton Beach, FL (US)

(72) Inventors: Adam Lucks, Parkland, FL (US); Philip Lucks, Boynton Beach, FL (US)

( * ) Notice: Subject to any disclaimer, the term of this patent is extended or adjusted under 35 U.S.C. 154(b) by 0 days.

(21) Appl. No.: 16/667,633

(22) Filed: Oct. 29, 2019

Related U.S. Application Data

(60) Provisional application No. 62/753,068, filed on Oct. 31, 2018.

(51) Int. Cl.
| | | |
|---|---|---|
| *G07C 9/25* | (2020.01) | |
| *G07C 9/00* | (2020.01) | |
| *G07C 9/27* | (2020.01) | |
| *G06K 7/14* | (2006.01) | |

(52) U.S. Cl.
CPC ......... *G07C 9/253* (2020.01); *G07C 9/00896* (2013.01); *G07C 9/257* (2020.01); *G07C 9/27* (2020.01); *G06K 7/1417* (2013.01)

(58) Field of Classification Search
CPC ...... G07C 9/253; G07C 9/00896; G07C 9/27; G06K 7/1417
USPC .......................................................... 340/5.2
See application file for complete search history.

(56) References Cited

U.S. PATENT DOCUMENTS

| | | | |
|---|---|---|---|
| 6,513,119 B1 | 1/2003 | Wenzel | |
| 9,424,699 B2 | 8/2016 | Kusens et al. | |
| 9,466,163 B2 | 10/2016 | Kusens et al. | |
| 9,589,403 B2 | 3/2017 | Lingan et al. | |
| 9,640,002 B1 | 5/2017 | Grosberg | |
| 9,685,016 B2 | 6/2017 | Randolph et al. | |
| 10,360,363 B1 * | 7/2019 | Grosberg | G06F 21/34 |
| 10,440,014 B1 * | 10/2019 | Hoyer | G06K 9/00 |
| 2009/0283582 A1 * | 11/2009 | Doan | G06Q 30/02 235/375 |
| 2013/0031611 A1 | 1/2013 | Barreto | |
| 2013/0048720 A1 | 2/2013 | Lewis | |
| 2014/0232522 A1 | 8/2014 | Schmidt-Lackner et al. | |
| 2016/0294572 A1 * | 10/2016 | Shadid | G07C 9/00182 |

(Continued)

FOREIGN PATENT DOCUMENTS

WO 2013034671 A1 3/2013

*Primary Examiner* — Vernal U Brown
(74) *Attorney, Agent, or Firm* — Glenn E. Gold, P.A.; Glenn E. Gold

(57) ABSTRACT

A system and method for providing resident-managed guest access to a residential community selectively accessible through an access gate provides an application running on wireless mobile devices of a respective community resident, guest of the resident, and a security guard manning a community access gate. A request for admission may be initiated by the guest via the guest's mobile device and communicated to the resident's mobile device via a pass-based remote access control management system. An access request response generated by the resident via the resident's mobile device and communicated to the remote access control management system generates a digital access pass including, inter alia, a readable unique QR code and a digital image of a guest photo ID. A security guard may scan the QR code and view the guest photo ID digital image in order to verify admission of the guest.

13 Claims, 29 Drawing Sheets

(56) References Cited

U.S. PATENT DOCUMENTS

2017/0146350 A1    5/2017   Beaurepaire
2018/0075229 A1*   3/2018   Jan ..................... G06K 7/1095

* cited by examiner

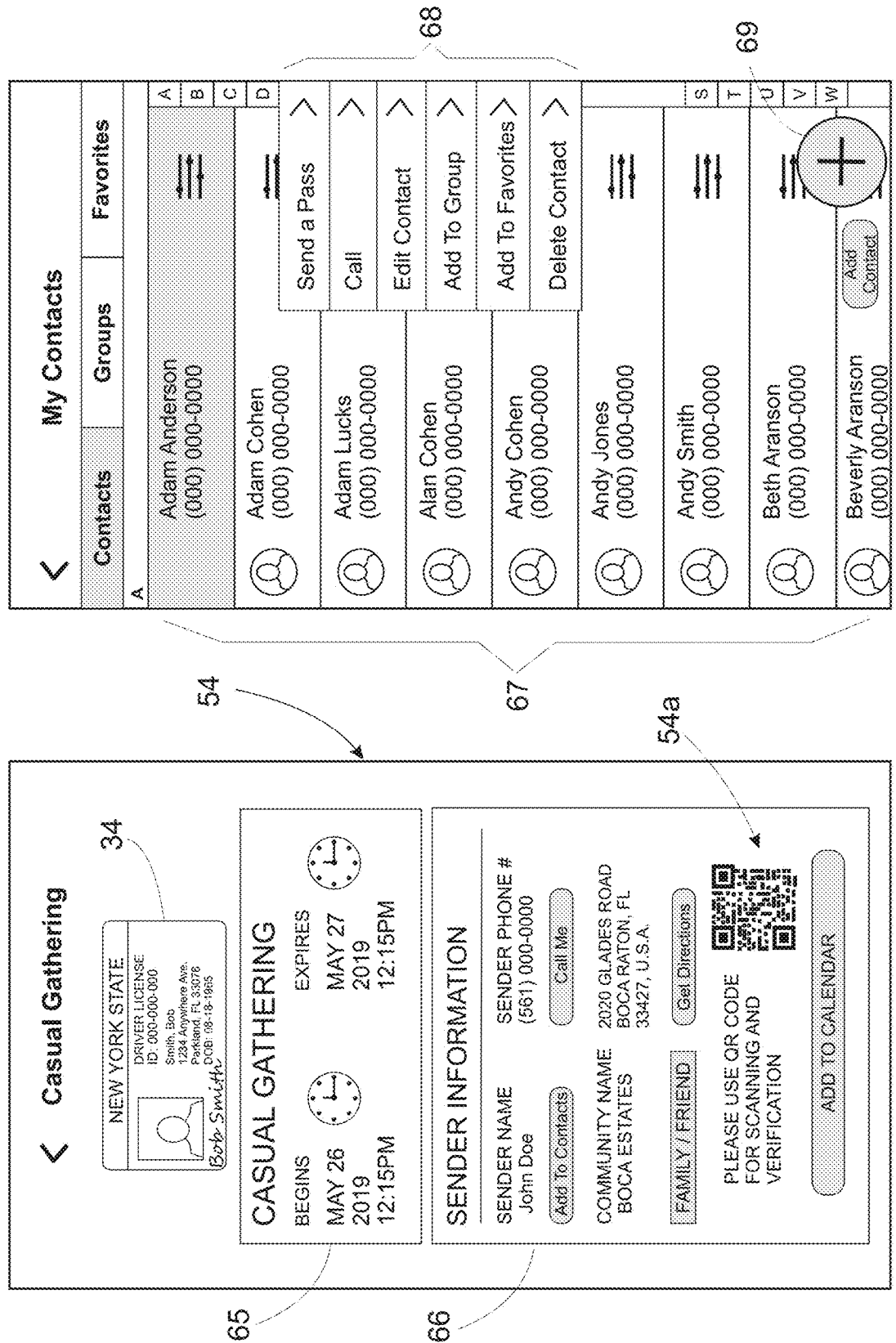

FIG. 33

Users List

| | | | | | | | | | |
|---|---|---|---|---|---|---|---|---|---|
| | | | | | | | | SEARCH | Create User |

| ID | Profile Image | Name | Phone Number | Email | Role | Community | Created | Actions |
|---|---|---|---|---|---|---|---|---|
| 976 | 👤 | John Doe | (954) 000-0000 | jdoe@aol.com | Head of Household | Parkland Reserve | 2 Days Ago | |
| 977 | 👤 | Jane Doe | (954) 000-0000 | janed@aol.com | Household Member | Parkland Reserve | 2 Days Ago | |
| 978 | 👤 | Jim Doe | (954) 000-0000 | jimd@aol.com | Household Member | Parkland Reserve | 2 Days Ago | |
| 979 | 👤 | Joe Blow | (561) 111-1111 | jb@gmail.com | Household Member | Boca Isles | 3 Days Ago | |
| 995 | 👤 | Sam Smith | (561) 000-0000 | ssmith@aol.com | Head of Household | Admirals Cove | 4 Days Ago | |

Sidebar:
- Search...
- Dashboard
- Roles
- Users Tab ∨
  - ○ Users ∨
  - ○ GUEST
  - ● RESIDENT
  - ○ Community Users <
- Residential Communities ∨
- Passes
- Guest Log
- Email Templates
- Admin Settings

FIG. 34

| Users List | | | | | | | | |
|---|---|---|---|---|---|---|---|---|
| | Create User | | | | | | SEARCH | |
| ID | Profile Image | Name | Phone Number | Email | Role | Community | Created | Actions |
| 987 | 😊 | John Smith | (954) 123-4567 | jsmith@aol.com | Guards / Security Personnel | Parkland Reserve | 2 Days Ago | |
| 988 | 😊 | Guard Fortsmen | (561) 123-4567 | guardf@aol.com | Guards / Security Personnel | Fox Ridge | 1 Day Ago | |
| 989 | 😊 | Umer Khan | (407) 123-4567 | ukhan@aol.com | Guards / Security Personnel | Motorola | 1 Day Ago | |

Search …

Dashboard

Roles

Users Tab ⌄
- Users
- Community Users ⌄
  - Community Admins
  - Security Guards
- Residential Communities ⌄

Passes

Guest Log

Email Templates

Admin Settings

FIG. 35

| Roles List | Create Role | | | | |
|---|---|---|---|---|---|
| ID △ | Name ◁▷ | Display Name ◁▷ | Description ◁▷ | Created ◁▷ | Action(s) ◁▷ |
| 1 | super_admin | Super Administrator / Owner | N/A | N/A | ✎ ✕ |
| 1 | sub_admin | Sub-Administrators (Community Administrators) | N/A | N/A | ✎ ✕ |
| 1 | employees | Employees | N/A | N/A | ✎ ✕ |
| 1 | family_head | Head of the Household | N/A | N/A | ✎ ✕ |
| 1 | family_member | Household Member | N/A | N/A | ✎ ✕ |
| 1 | guests_outsiders_one_time | Guests / Outsiders (One Time) | N/A | N/A | ✎ ✕ |
| 1 | guests_outsiders_daily | Guests / Outsiders (Daily) | N/A | N/A | ✎ ✕ |
| 1 | guards | Guards / Security Personnel | N/A | N/A | ✎ ✕ |

Sidebar:
- Search ...
- Dashboard
- Roles
- Users Tab ⌄
- Residential Communities ⌄
- Passes
- Guest Log
- Email Templates
- Admin Settings

SEARCH

SENT PASSES LIST
(All Passes Sent Out For A Community)

| SENDER | | COMMUNITY | | RECIPIENTS | | EVENT NAME | | |
| PASS VALIDITY | | PASS START DATE | | PASS EXPIRATION DATE | | SEARCH FILTER | | |

| ID | Sender | Comm-unity | Recipients | Start | Expiration | Descrip-tion | Created |
|---|---|---|---|---|---|---|---|
| 001 | Joe Smith | Fox Ridge | RECIPIENTS | May 7, 2019 6:00pm | May 9, 2019 6:00pm | PIZZA PARTY | May 1, 2019 2:00pm |
| | | | | | | | |
| | | | | | | | |

Search...

Dashboard
Roles
Users Tab ∨
Residential Communities ∨
Passes
Guest Log
Pass Requests
Offensive Words
Email Templates
Admin Settings

FIG. 39

GUEST LOG

| SENDER | | COMMUNITY | | EVENT NAME | | | SEARCH FILTER |
|---|---|---|---|---|---|---|---|

PASS START DATE

PASS EXPIRATION DATE

PASS SCAN DATE

PASS SCAN START TIME

PASS SCAN BY GUARD

| QR Code | Pass Image | Sender Name | Comm. Name | Event Name | Pass Start Time | Expires | Scan Time | Status | Actions |
|---|---|---|---|---|---|---|---|---|---|
| [QR] | [img] | ADAM LUCKY | FOX RIDGE | PIZZA PARTY | May 1, 2019 2:00pm | May 9, 2019 6:00pm | May 7, 2019 6:00pm | QR Code Verified SUCCESS | ✕ |
| [QR] | [img] | ADAM LUCKY | FOX RIDGE | PIZZA PARTY | May 1, 2019 2:00pm | May 9, 2019 6:00pm | May 7, 2019 6:00pm | QR Code Expired ERROR | ✕ |

Search...

- Dashboard
- Roles
- Users Tab ⌄
- Residential Communities ⌄
- Passes
- Guest Log
- Email Templates
- Admin Settings

FIG. 40

PASS REQUEST LOG
(Passes Requested - By Community)

| SENDER | | REQUEST RECEIVED BY | | RECIPIENTS | | DESCRIPTION | | |
|---|---|---|---|---|---|---|---|---|
| REQUEST DATE | | | | | | | SEARCH FILTER | |

| | | | | | | | RESET | SUBMIT |

| ID | Sender | Requested Of... | Description | Start | Status | Action(s) |
|---|---|---|---|---|---|---|
| 57 | Plumber | Joe Resident | Fix Plumbing | 10/20/2019 9:00AM | PENDING | X |
| 56 | Joe Brown | Joe Resident | Poker Game | 10/20/2019 9:00PM | PENDING | X |

Search...

- Dashboard
- Roles
- Users Tab ∨
- Residential Communities ∨
- Passes
- Guest Log
- Pass Requests
- Offensive Words
- Email Templates
- Admin Settings

RFID Tracking

| ADMIN GUIDE |
|---|
| Search ... |
| Dashboard |
| Roles |
| Users Tab ˅ |
| Residential Communities ˅ |
| Passes |
| Guest Log |
| Pass Requests |
| Offensive Words |
| Email Templates |
| Admin Settings |
| Scanners |
| Residential Lane ˅ |
| RFID Tags |
| RFID Tracking |

Search Filter ˅

| ID | Transponder No. | Resident Image | Resident Name | Community | Scan | Status | Actions |
|---|---|---|---|---|---|---|---|
| 01 | 2346756 | 👤 | Resident 01 | Community 1 | 10/21/2019 5:15PM | RFID Scanned Successfully | ✕ |
| 01 | 2346757 | 👤 | Resident 02 | Community 2 | 10/22/2019 5:45PM | RFID Scanned Successfully | ✕ |
| 01 | 2346758 | 👤 | Resident 03 | Community 3 | 10/23/2019 6:30AM | RFID Scanned Successfully | ✕ |
| 01 | 2346769 | 👤 | Resident 04 | Community 4 | 10/23/2019 2:25PM | RFID Scanned Successfully | ✕ |
| 01 | 2346770 | 👤 | Resident 05 | Community 5 | 10/23/2019 5:15PM | RFID Scanned Successfully | ✕ |
| 01 | 2346771 | 👤 | Resident 06 | Community 6 | 10/24/2019 7:15AM | RFID Scanned Successfully | ✕ |

FIG. 43

PASS-BASED SYSTEM AND METHOD FOR RESIDENT-MANAGED ENTRY OF GUEST VEHICLES TO A GUARD-MONITORED GATED COMMUNITY

CROSS-REFERENCE TO RELATED APPLICATION

This U.S. non-provisional patent application claims priority to U.S. provisional patent application No. 62/753,068, filed on Oct. 31, 2018, the entire contents of which are incorporated by reference herein.

FIELD OF THE INVENTION

The present invention is generally directed to access verification of guest vehicles to a security guard-monitored, gated area. More specifically, this invention pertains to a system and method for providing resident-managed guest vehicle entry to a security guard-monitored community. Embodiments of the invention enable residents of a community to remotely initiate the generation of customizable, guest digital access passes from a resident-controlled mobile smart device; wirelessly communicate the digital access passes, via a central guest access management system, to corresponding nonresident guest mobile smart devices; and subsequently manage pass details.

BACKGROUND OF THE INVENTION

Many residential and commercial settings include geographic areas or regions that incorporate gates, or similar access control structures, particularly designed and configured to selectively restrict vehicle access to the gate-secured areas/regions. For instance, many residential communities containing, for example, single family homes, townhouses, condominiums and apartment buildings, are security guard-monitored gated areas designed to restrict access by unauthorized nonresident guest vehicles attempting entry. With respect to residential communities, security guard monitoring may be employed as a means of restricting access to residents of the community and resident-verified guests. Likewise, various private and public commercial locations incorporate security guard-monitored gated parking lots and garages.

While the use of electronic gates—particularly, those attended to by a security guard—as a means of providing some degree of security is generally beneficial, such access control has attendant limitations and drawbacks. Conventionally, secured residential communities employ an electronic gate access control system incorporating a control device communicating with resident vehicle transponders, or transponder RFID tags affixed to a vehicle front windshield, enabling unrestricted efficient ingress and egress to the community without requiring any security guard interaction. However, public access by nonresidents is restricted; often requiring security guard approval. Nonresident guests are subjected to a cumbersome and inefficient entry verification process wherein: the guest initially provides the security guard with a photo ID, such as a driver's license; the security guard walks back to a guard/gate house to record information from the photo ID, which may include inputting the guest photo ID information into a computer (e.g., to determine whether the guest is already entered into a computer database and included on the resident's "guest list"); the security guard phones the resident to obtain verbal authorization to allow the guest vehicle to enter the community (particularly, where the guest is not on a resident guest list); the security guard opens the gate; and, finally, the security guard walks back out to the guest vehicle to return the guest's photo ID.

Oftentimes, once a determination has been made to allow a guest to enter a gated area an attendant will perform additional steps, such as recording a vehicle license plate number, issuing a temporary parking pass, etc. In most gated communities, this inefficient manual access verification process creates frustrating guest entry delays. Furthermore, it is not uncommon for vehicle lines to form in front of the residential entry gate on the resident side of a gated entryway to a community. This may occur, for instance, due to a malfunction with the resident gate transponder system. In such instances, residents may have to go through the same guest access security guard identification process to gain entry through the guest side of the gated entryway.

In addition to the aforementioned access delay issues associated with entry into a gated area, the benefits of security gates are often offset by a host of other drawbacks, disadvantages, and limitations. For example, residents hosting a party often have to deal with incessant phone calls from a security guard, or other gatehouse attendant, as each vehicle containing occupants purporting to be guests of the resident hosting the party are subjected to the manual identification process. Another issue—common in both residential and commercial gated area contexts—relates to gatehouse attendants having to confirm the legitimacy of commercial contractors (e.g. landscapers, plumbers, electricians, etc.) attempting to gain entry to an area. In that case, the gate attendant often has to make multiple attempts to reach one or more residents when a contractor shows up while the resident is not home. This not only slows down the guest entry process, but oftentimes—particularly in instances where a community does not allow a resident to preauthorize the gatehouse attendant to allow contractors to enter—creates a burden on the resident. That is, it often requires the resident to be available to receive a phone call to confirm that the contractor is, in fact, expected. This issue is further exacerbated in instances where one or more commercial contractors need to gain temporary entry over a period of days, weeks, or even months.

Various electronic access control systems are known that attempt to address one or more of the aforementioned issues associated with conventional manual gate entry systems. However, they all suffer from one or more drawbacks, disadvantages and limitations. For instance, many proposed systems are highly complex and/or dependent upon the use of expensive electronic equipment to create a security access system geared to replace a physical guard with, for example, a kiosk including video cameras, monitors, microphones, control equipment and the like. Some such known systems provide users with the ability to grant temporary or limited access to guests into secured areas based upon geolocation tracking, by providing navigational services to members and guests, using a sophisticated system incorporating, for example, an arrangement of wireless radio, sound and/or light-based beacons communicating with member and guest electronic devices to send electronic access keys to a guest's smartphone or other electronic device. Still others are generally directed toward systems and methods including, for instance, an embedded local control device communicative with an electronic gate or lock. At least one mobile device-operated system is specifically geared for use in communities incorporating unattended electronic security gate systems. In that case, a so-called "access token" is communicated to the guest's mobile device and, when the guest device is within a particular geographic range of the electronic security gate, the system communicates a website link to the guest device and, when the guest accesses the website, the guest can, via an access control management system, activate and open the gate.

There is a need for a more automated system particularly adapted for use in security guard-monitored gated communities in which nonresident access is restricted—requiring nonresident guests to go through a conventional manual access verification process. In lieu of complex and expensive systems—often prone to malfunctioning—it would be highly desirable to provide a system incorporating features that enable users, such as residents of a gated residential community, to utilize their existing conventional mobile devices, such as mobile smartphones, which are ubiquitous, to maintain control over the entry of guests, visitors, contractors and the like, into a residential community without requiring excessive communication and feedback with a human security gate attendant.

It would be very beneficial to provide a noncomplex, efficient, easy to use, cost effective system and method operable via application software downloadable to a conventional mobile device, such as a mobile smartphone, which most individuals already own. It would be highly desirable to provide such a system and method that is not only implementable through the use of conventional mobile devices, but which is able to integrate various features and functions that are already resident on a user's mobile device, such as a user mobile device contact database, in such a manner that a residential user can provide selective access to individuals already stored within the resident's device. Furthermore, it would be highly desirable to provide such an application-implemented method having the flexibility to enable a user (e.g. resident) to automatically create digital entry passes to be communicated in real time to one or more preselected individuals, for example, from a resident's mobile device contacts, including resident-defined and managed date/time durations. Various additional desirable features, by way of example, may include: the ability to enable guests to initiate an electronic request to have a pass generated on-the-fly by a resident and promptly communicated back to the guest device; the ability to provide resident users with the flexibility to dynamically terminate/retract issued passes, and dynamically modify issued pass variables such as date and time durations; simultaneously create and communicate an electronic pass in bulk to multiple guest devices (e.g. for large gatherings); the ability to easily track which guests have arrived, which guests have not arrived, and which guests have arrived and subsequently departed the community; and the ability to enable residents to create and send themselves a guest pass (e.g. to enable entry through a guest-side gate where a corresponding resident-side gate is inoperable).

SUMMARY OF THE INVENTION

The present invention is generally directed to a digital pass-based system and method for resident-managed entry of a guest vehicle into a resident community. In one general aspect, a method for providing resident-controlled, verified nonresident admission to an access-controlled community location may include steps of: (a) communicating, from a resident mobile device to a pass-based remote access control management system, resident authorization to generate and communicate a digital access pass to the nonresident mobile device for admission into the access-controlled community location, the pass-based remote access control management system including a computer processor, a memory device, a communication device, data storage, a member registration module, and a pass request/pass generation module; (b) generating, at the remote access control management system, a digital access pass comprising a digital image of a nonresident photo ID, resident-defined time parameters, resident contact and community location information, and a unique optically-readable code generated by the access control management system and associated with the nonresident photo ID, resident-defined time parameters, and resident contact and community location information; (c) transmitting the generated digital access pass from the remote access control management system to the nonresident mobile device, the remote access control management system storing the digital access pass data in a system database, the digital access pass data remotely accessible and manageable from the resident mobile device; (d) displaying the digital access pass on the nonresident mobile device; and (e) scanning the unique optically-readable code at the access-controlled community location in order to verify nonresident admission thereto.

In an aspect, the method may include a step of receiving a request at a resident mobile device from a nonresident mobile device to send a digital access pass for nonresident admission into the access-controlled community location.

In another aspect, the step of scanning may include scanning the unique optically-readable code via a security guard mobile device in order to verify nonresident guest access to the access-controlled community location.

In another aspect, the step of scanning may further include scanning the unique optically-readable code via a security guard mobile device in order to verify nonresident guest access to the access-controlled community location.

In another aspect, the method may include, after the step of transmitting the generated digital access pass from the remote access control management system to the nonresident mobile device, a step of: modifying details of the generated digital access pass via communicative interaction between the resident mobile device and the remote access control management system.

In another aspect, the method may include, after the step of transmitting the generated digital access pass from the remote access control management system to the nonresident mobile device, a step of retracting the generated digital access pass via communicative interaction between the resident mobile device and the remote access control management system.

In another aspect, the step of generating a digital access pass may further include generating a digital access pass wherein the entire area of the pass cannot be displayed on a display of a mobile device such that the digital image of the nonresident photo ID and the unique optically-readable code cannot be simultaneously viewed.

In a further aspect, the method may further include, prior to the step of communicating a request for a pass, a step of registering the guest mobile device with the pass-based remote access control management system.

In a further aspect, the step of generating a digital access pass further include the computer processor functioning to gather, and subsequently organize, the digital image of a nonresident photo ID, the resident-defined time parameters, the resident contact and community location information, and the unique optically-readable code generated by the access control management system into a unitary digital access pass image.

In another aspect, the step of communicating, from a resident mobile device to a pass-based remote access control management system, resident authorization to generate and communicate a digital access pass to the nonresident mobile device for admission into the access-controlled community location, may further include communicating a request from a security guard mobile device to the pass-based remote access control management system, and subsequently communicating a digital pass from the remote access control management system to the nonresident mobile device, wherein the pass issuance is initiated by the security guard on behalf of the resident.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying figures, where like numerals denote like elements, and in which:

FIG. 18 is an exemplary schematic screen shot of the system and method of the invention, showing details of a pass displayed on a member mobile device;

FIGS. 19-20 are exemplary schematic screen shots of the system and method of the invention, showing member contact list features and functions accessible from a member mobile device;

FIGS. 33-43 are exemplary schematic screen shots of the system and method of the invention, illustrating a backend part of the system and method of the invention; namely, interactive databases accessible to a system administrator for management of residential communities and community members, in accordance with at least some embodiments of the invention.

DETAILED DESCRIPTION OF PREFERRED IMPLEMENTATIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. There is no intention to be bound by any expressed or implied theory presented in the preceding technical field, background, brief summary or the following detailed description. It is also to be understood that any specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in the accompanying drawings, the present invention is directed to a system 10 and method 100 for resident-managed, verified guest access into a monitored gated community. For convenience, the invention is primarily shown and described with respect to a conventional residential gated community. However, the invention is not intended to be so limiting—it is applicable for use with any residential or commercial access-restricted area. With respect to commercial settings, for example, a business may implement the system and method to control and manage access to non-employee guests, such as vendors and contractors. In that case, for instance, an employer and/or employees may be deemed "residents" and vendors and/or contractor may be deemed "nonresidents" or "guests" vis-à-vis the method 100. In other words, the terms "resident" and "nonresident" (or "guest"), as used herein, define the relative roles of a pass authorizer, or pass issuer, and pass recipient during a particular pass issuance process. That is, an individual system member may be deemed a "resident" vis-à-vis the issuance of passes to nonresident guests of the resident member's community, while being deemed a "nonresident," or "guest," with respect to passes received by the member to enter other secured locations outside of the member's own residential community.

Figure 1:
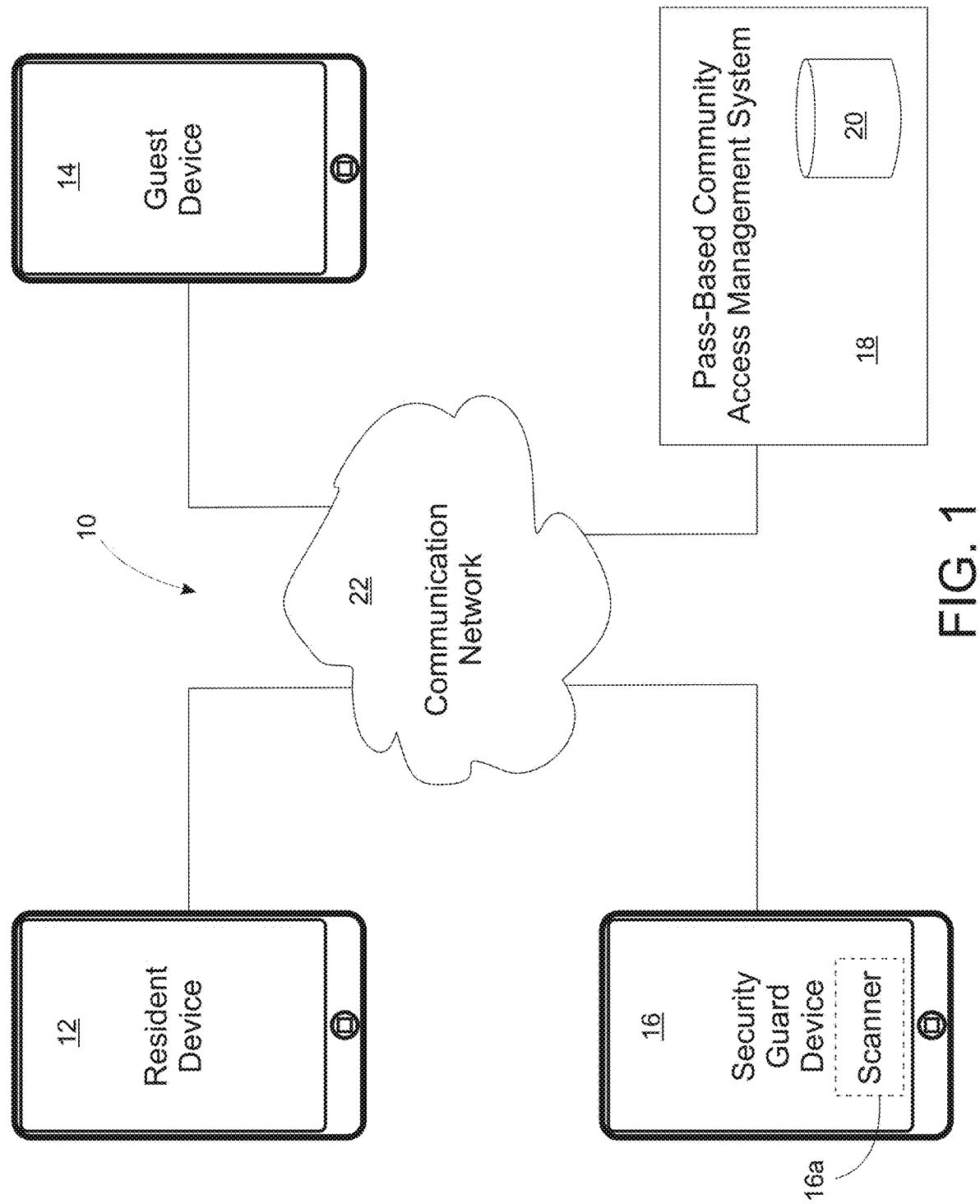
FIG. 1 is a schematic diagram illustrating the system of at least one embodiment.
Figure 2:
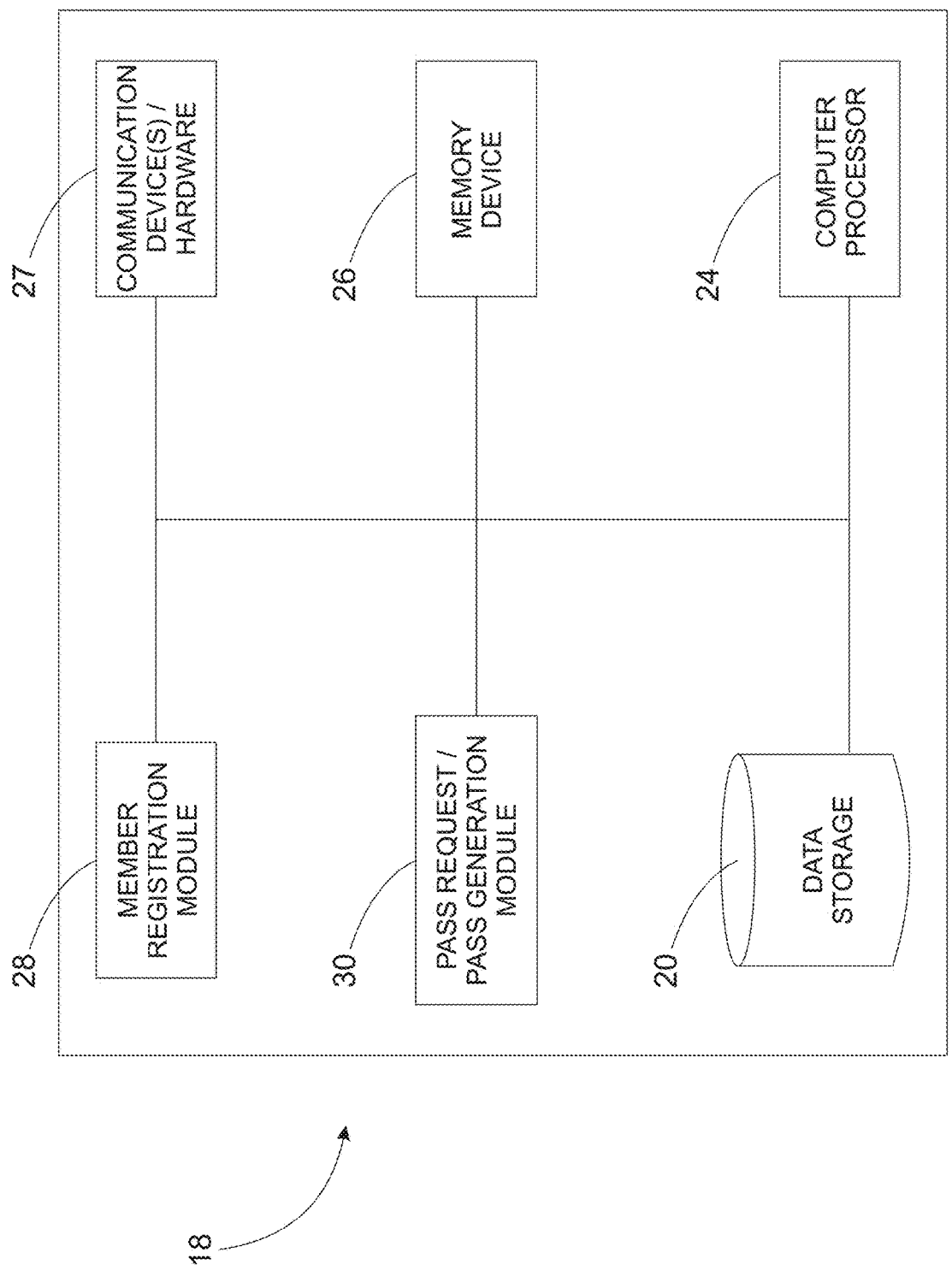
FIG. 2 is a block diagram of the Central Access Management System and at least some of the components thereof as provided in accordance with at least one embodiment of the invention.

Referring now generally to FIGS. 1-43, and primarily to FIGS. 1-2, with respect to access-controlled residential communities, the system 10 and corresponding method 100 provide a means for enabling community residents to remotely authorize the generation of customized digital passes 54 (FIG. 18) for communication to one or more nonresident guest mobile devices 14 (e.g. a smart phone) from a resident mobile device 12, and to subsequently manage previously-issued guest passes to, for example, change one or more active guest pass variables (e.g. active dates and times) or retract a previously-issued guest pass altogether. As described in further detail herein, in order to participate as a resident member and/or nonresident guest member, a system user must complete a member registration process from a user smartphone communicating bi-directionally with Member Registration Module 28 (FIG. 2).

Significantly, each digital pass 54 is generated via a Pass Request/Pass Generation Module 30 (FIG. 2) of digital pass-based community access management system 18 to include, among other things, a picture identification 34 (e.g., a driver license, passport, or military ID) of the guest pass recipient, and a unique scanner-readable code 54a such as a quick response (QR) code generated by the community access management system and uniquely associated with a corresponding pass recipient mobile device (e.g. via associating with the mobile device phone number). In some embodiments, a community security guard mobile device 16 (e.g. a portable computer tablet device) located at the gated community entrance and having a scanning functionality 16a (e.g. in the form of a mobile scanner application residing on the security guard device and operating in cooperation with a mobile device camera) may be used to optically read the digital pass QR code displayed on the display screen 13 (FIG. 4) of the guest device 14; enabling the community access management system 18 to confirm the validity of the digital pass and to communicate the pass validity back to the security guard mobile device 16. Subsequently, upon confirming that a digital pass 54 is valid, the security guard may confirm the identity of the nonresident guest via the guest picture ID digital image 34 (FIGS. 7, 18) integrated into the digital pass 54 assembled by the system 18.

The various embodiments of the present invention include a pass-based community access management system, generally referenced as 18, which, as described herein, is structured and configured to receive pass generation requests and, as appropriate, generate corresponding digital access passes 54 for subsequent communication to one or more member mobile devices, including guest devices 14 or, as described further herein, a resident mobile device 12 (i.e., in instances where a resident may issue herself a digital pass to gain entry to her own residential community). The community access management system 18 may be located remotely from the resident device 12, guest device 14 and security guard device 16, wherein communication between the resident device, guest device, security guard device, and community access management system may be conducted via a wireless communication network 22, including, but not limited to, the TCP/IP, World Wide Web, Internet, Wide Area Network, cellular or telecommunication network(s). Furthermore, the community access management system 18 of at least one embodiment of the present invention may include: a data storage device 20; a computer processor 24; a memory device 26; one or more communication devices or hardware 27, such as network device(s) and web server(s); a member registration module 28; and a pass request/pass generation module 30. More specifically, the community access management system 18 and/or computer processor 24 of at least one implementation of the present invention may comprise one or more web servers or data servers, including software and hardware to receive and process pass requests, and to communicate data, information, web pages, applications, commands, SMS messages, text messages, email messages, etc. via the network 22.

The computer processor 24 may include, for example, any device cooperatively structured to execute or implement computer instructions, software, etc. The data storage device 20, as used herein, may include one or more internal, external or removable hard disk drives, CD/DVD, USB drives, solid state drives, virtual drives, cloud-based storage devices, or other types of volatile and non-volatile memory. One or more relational databases may be implemented on or within storage device(s) 20 of the present invention; for example, in order to store and retrieve various information or data corresponding to digital passes 54 as described herein. Further, the memory device 26 may include, but is not limited to, random access memory (RAM) or other like devices configured to implement the present invention in the intended manner; for example, by at least temporarily storing and assisting with the execution of one or more applications or computer programs capable of implementing the system 10 and method 100 described herein. Moreover, the communication device 27 may include a network communication hardware/software component or module structured to facilitate communication between resident device(s) 12, guest device(s) 14, and security guard device(s) 16 in order to receive and process pass requests.

Figure 3:
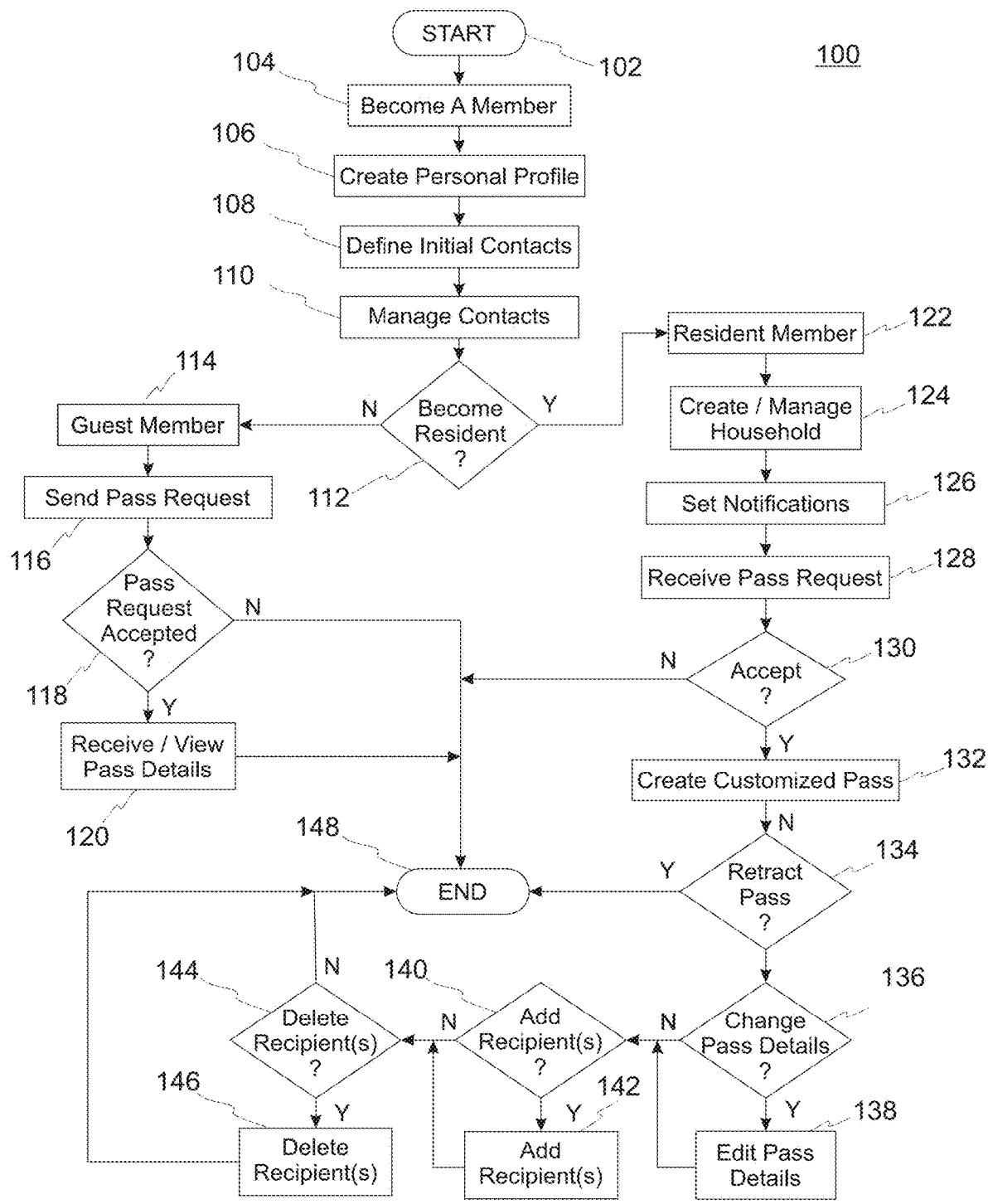
FIG. 3 is a high level flow chart illustrating the method as disclosed in accordance with at least one embodiment of the invention.
Figure 4:
FIGS. 4-7 are exemplary schematic screen shots of the system and method of the invention, showing a member profile creation process using a mobile smart device.
Figure 5:
Figure 7:
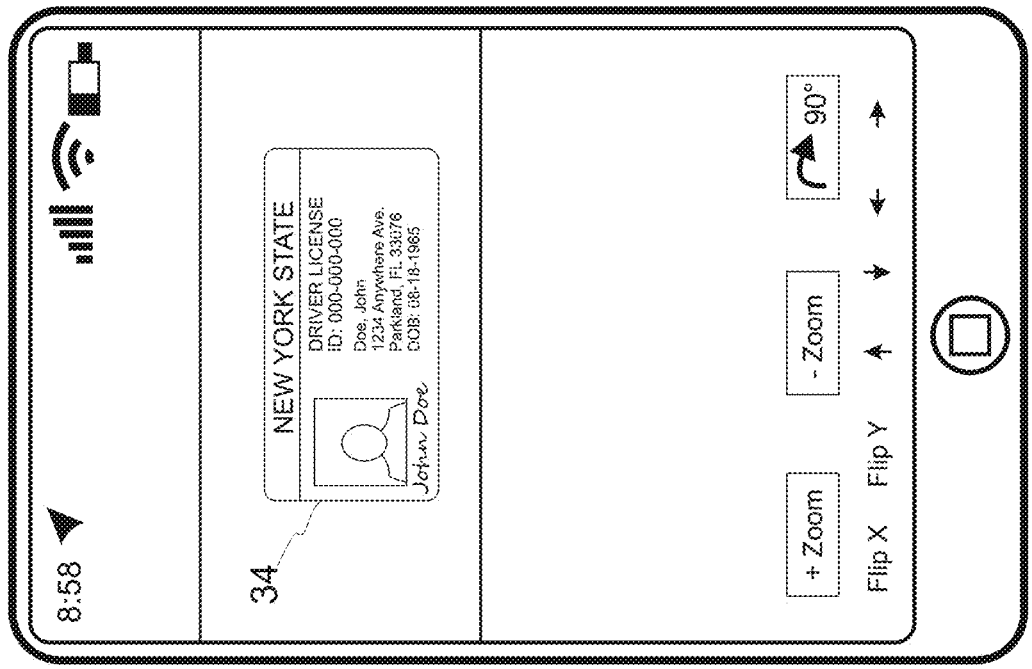
Figure 6:
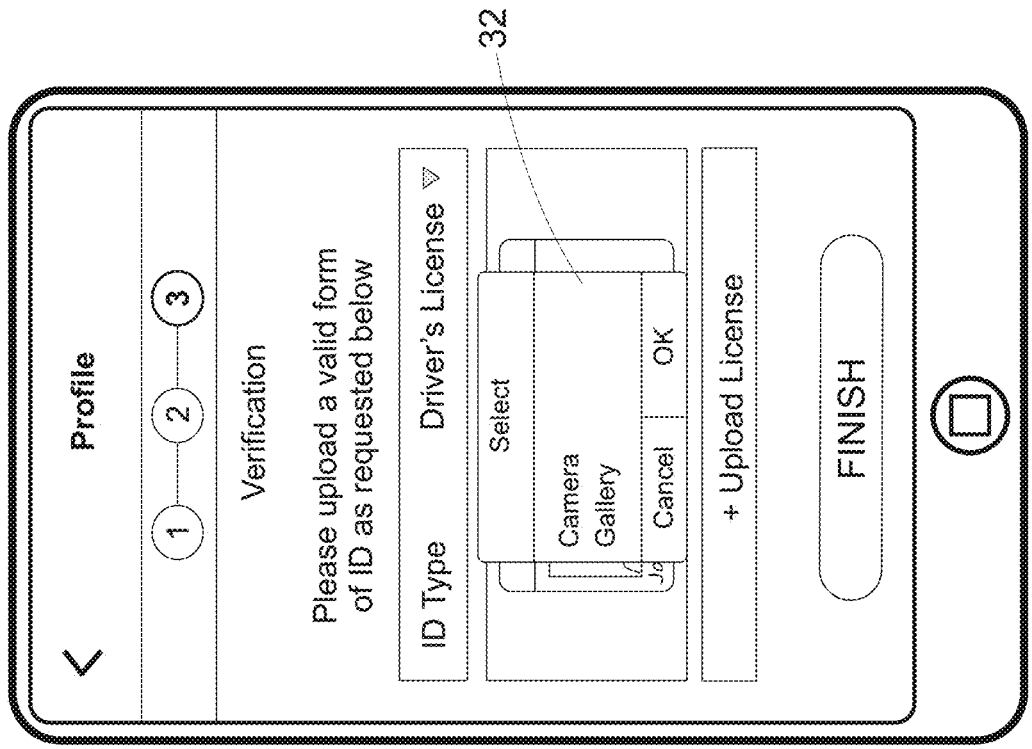

Referring now to FIG. 3, in accordance with a general method 100 of the present invention starting at step 102, potential users of the system may become registered members at step 104. Becoming a registered member may be accomplished by downloading a software application to a personal mobile device—preferably a smartphone having an associated mobile device phone number. Initially, the user provides information via a system website signup page, including the user's full name, mobile device phone number, and a user-selected password. At this step, existing members may simply fill in their mobile device phone number and previously created password to gain system access. At step 106, the user creates a personal profile by providing the following: (1) general information, including the user's date of birth, mobile device phone number, and email address (FIG. 4); (2) contact information, including the user's home address (FIG. 5); and (3) an uploaded user photographic identification, or photo ID (FIGS. 6-7). Uploading a photo ID requires first selecting, from a drop down menu 32, whether the user prefers to upload an existing photo ID stored in the user's mobile device picture gallery or, alternatively, to generate a new photo ID image for upload using the picture-taking functionality of a native mobile device camera application, as shown in FIG. 7. Subsequently, the user-provided general information, contact information, and uploaded photo ID digital representation 34 are wirelessly communicated to the community access management system 18 and maintained in/on database storage device 20. At this point, the user is now defined as a system member.

Figure 8:
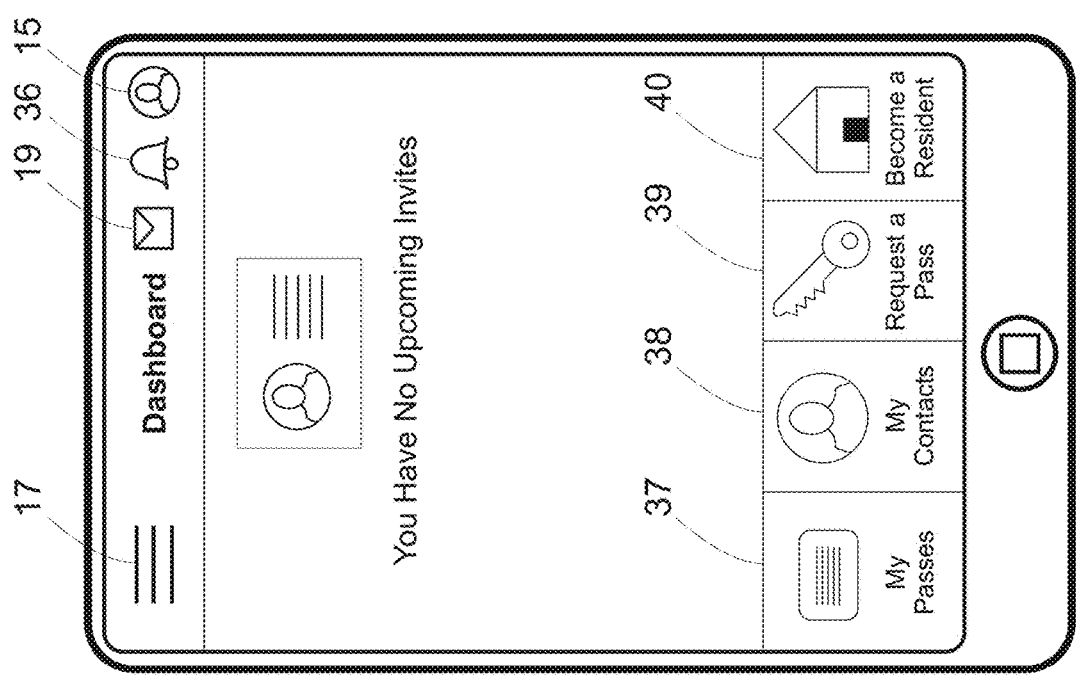
Figure 25:
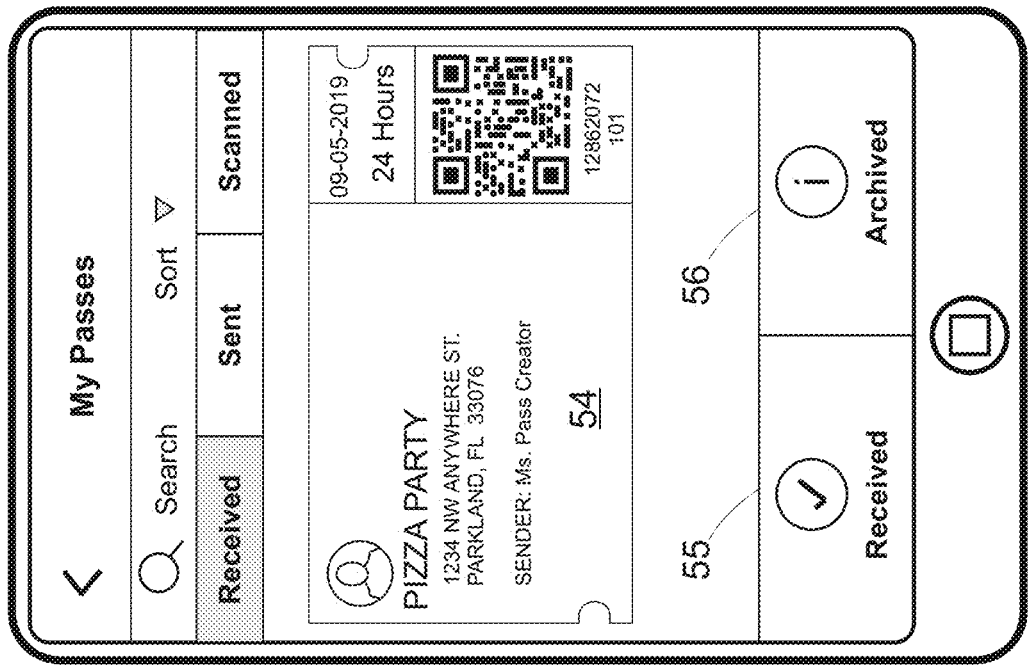
FIGS. 25-27 are exemplary schematic screen shots of the system and method of the invention, showing member pass-related features and functions accessible from a member mobile device, in accordance with at least some embodiments of the invention.
Figure 24:
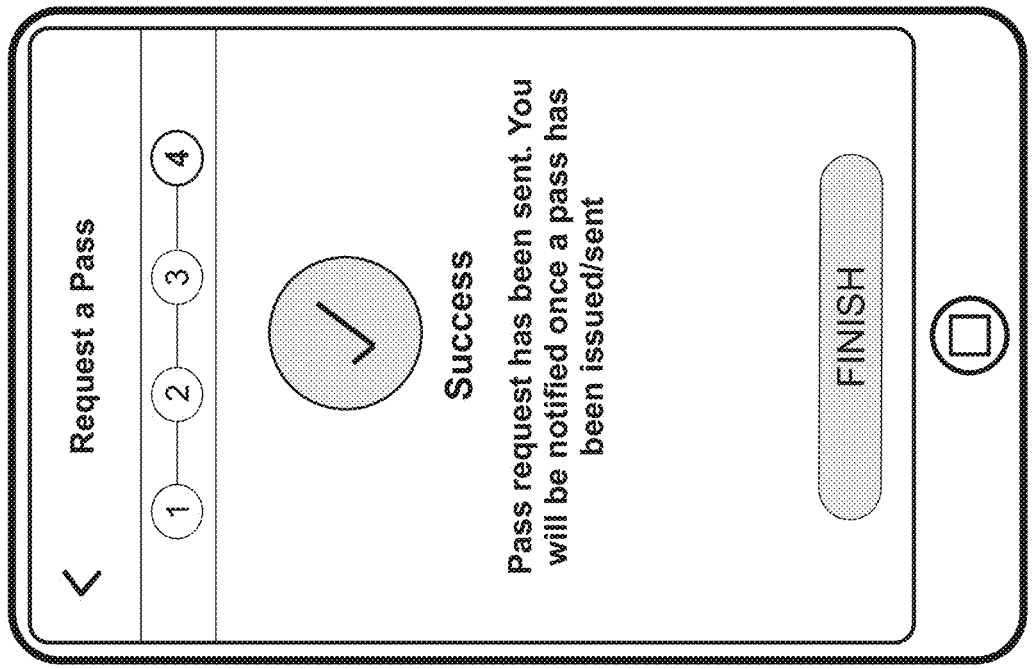
Figure 27:
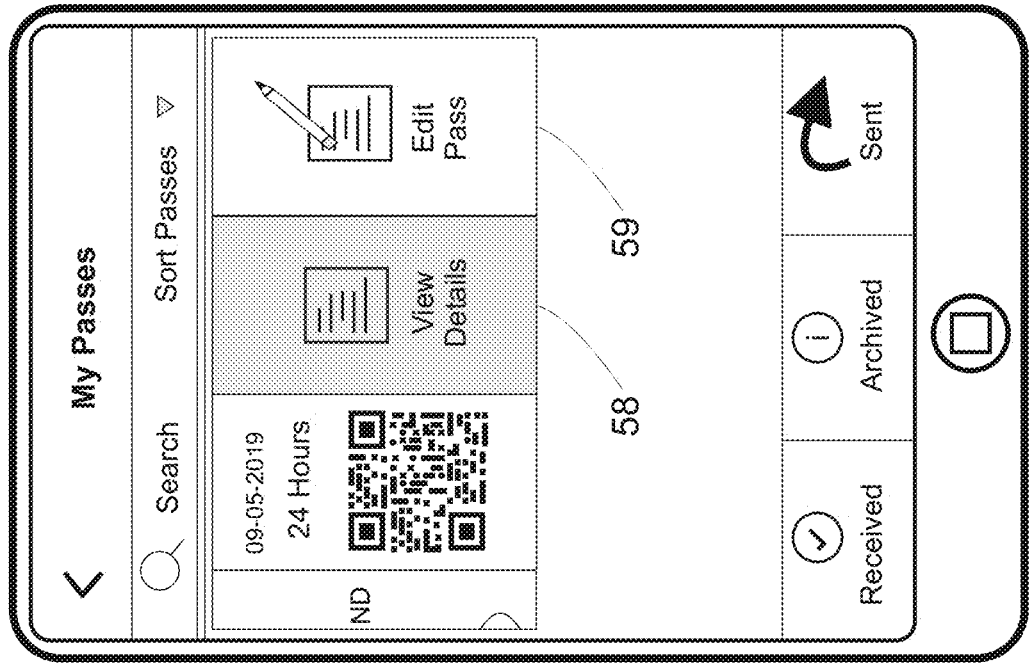
Figure 26:
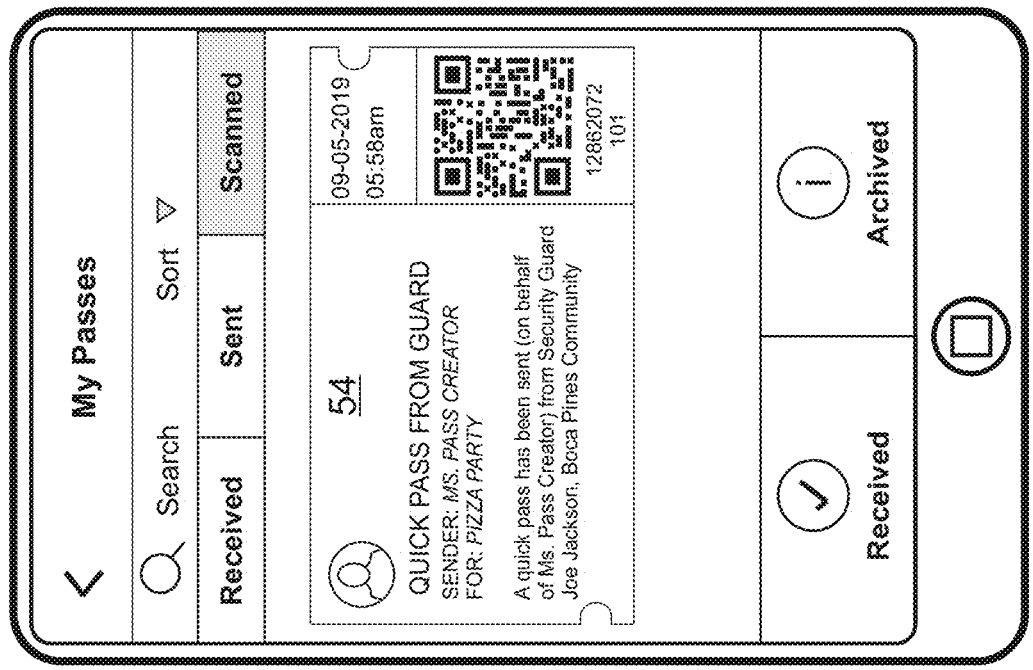

Referring now primarily to FIG. 8, at steps 108 and 110, the system member defines and manages her contacts. The system member has access to a series of different personal Dashboard pages, where, for example, the user may select from the following options: My Contacts 38, where the member may view and sync one or more contacts from the member mobile device for use with the system, as well as view existing previously-synced system contacts; My Passes 37, where, for example, guest and resident members may view and manage existing received and archived passes, and where resident members may further view active sent passes, as schematically depicted in FIGS. 25-27; Request a Pass 39 from an existing resident member, as schematically depicted in FIGS. 21-24; and Become a Resident 40. At step 112, the system member may elect to become a resident member, whereby a guest member may become a resident member associated with a participating system community. Otherwise, at step 114, the system member remains identified as a guest member. As a guest member, a system user may, at step 116, communicate a pass request to a resident member in order to gain access to a resident member community. If the pass request is accepted by the resident member, at step 118, the community access management system generates a digital pass and communicates the digital pass to the nonresident guest member, whom receives, and may review, pass details, at step 120. Subsequently, the digital pass may be used by the guest member to gain access to the respective community in accordance with time parameters set by the resident member—unless the pass is subsequently retracted by resident prior to guest use.

Figure 9:
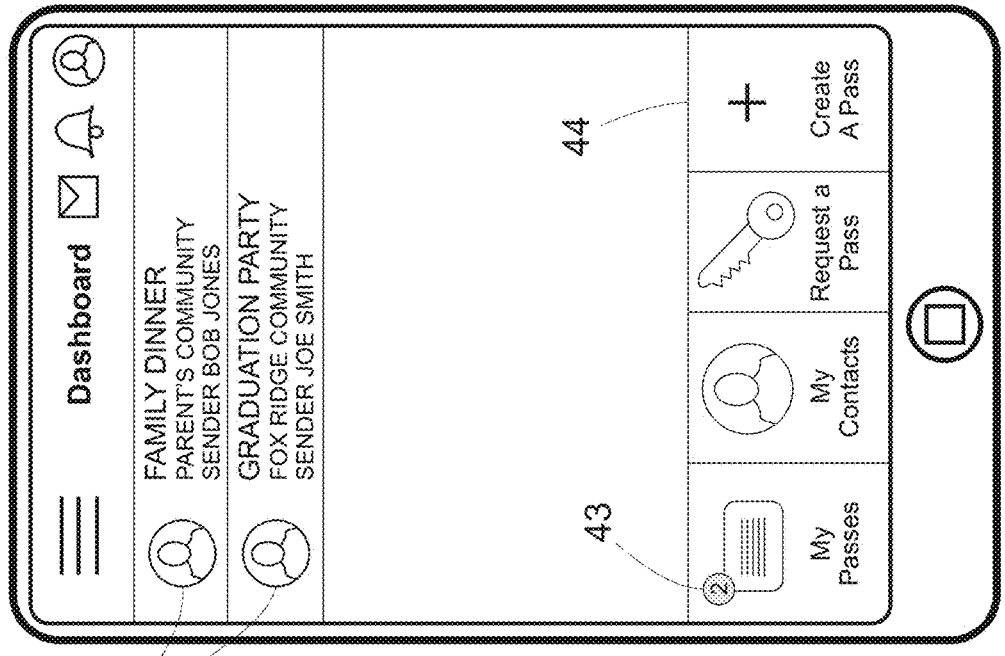
FIGS. 8-9 are exemplary schematic screen shots of the system and method of the invention, showing certain features and functions displayed on a screen of a member mobile smart device.

Referring now particularly to FIGS. 3, 8 and 9, at step 122 (FIG. 3), upon selecting the Become a Resident 40 icon/option (FIG. 8) the guest member mobile device communicates a request, via communication network 22, to community access management system 18. Upon confirming that guest member mobile device 12 belongs to a resident of a participating residential community—for example, by cross-checking, via computer processor 24, the requesting guest member mobile device phone number against existing residential community member data maintained at system data storage 20—the system 18 generates a temporary verification code for communication, such as by email or SMS message, to the guest member mobile device 14. Upon entering the verification code, the code is communicated from the guest member mobile device back to the system 18, which, upon authenticating the user as a resident member, enables access to all resident features of the member's community. As described in further detail herein, as a guest member a user may send a pass request to a resident member, at step 116. At step 118, the guest pass request is either accepted or rejected by the resident member. If the pass request is accepted the guest member receives, and may display/view, pass details (FIG. 18), at step 120. Alternatively, if the pass request is rejected the process ends, at step 148.

As best shown in FIG. 9, at step 122 (FIG. 3) once a guest member has become a resident member, she has the further option of selecting the Create a Pass option 44 to initiate the process of creating a pass to be generated by community access management system 18 and subsequently communicated by the system 18 to, for example, one or more non-member contact(s), guest user contact(s), and/or herself. In instances where a resident member sends a pass to a non-member, the system 18 communicates, for example, a Uniform Resource Locator (URL), or web address, link to the nonmember to download a system mobile application to a nonmember mobile device. Once the nonmember is deemed a system member contact her device may receive a resident member-issued pass.

As best shown in FIGS. 8-9, an exemplary member Dashboard screen may display a My Passes notification 43 identifying new passes 42, which may be displayed on the resident member mobile device 12. The resident member may further select a displayed pass 42 to toggle to a pass details screen (FIG. 18). Furthermore, when there are any notifications regarding one or more of a member's active passes, an alert bell 36 is displayed on the member mobile device screen. A member may toggle between multiple accounts via a user profile icon 15. Furthermore, a system-generated message may be viewed by selecting a mail icon 19 displayed on the member device. For example, if a new member provides a contact email address matching that of an existing system user, the existing system will be alerted that the new user is attempting to sign up with the same email address. Furthermore, in that instance, the existing user will be presented with an option to either grant or block the new user from accessing resident features. If the existing user elects to grant new user access, the system 18 generates a unique code, communicates the code to the existing user mobile device, and requires that the existing user enter the unique code before the system will grant resident access to the new user. Moreover, by selecting a navigation menu icon 17 the system toggles to a navigation menu screen, such as the exemplary Pages screen shown in FIG. 10. The Pages screen may display a menu 46 from which a resident member may select from Manage Household (with permission), Settings (where push and email notifications may be turned on/off), Edit Profile, and Logout options.

Figure 11:
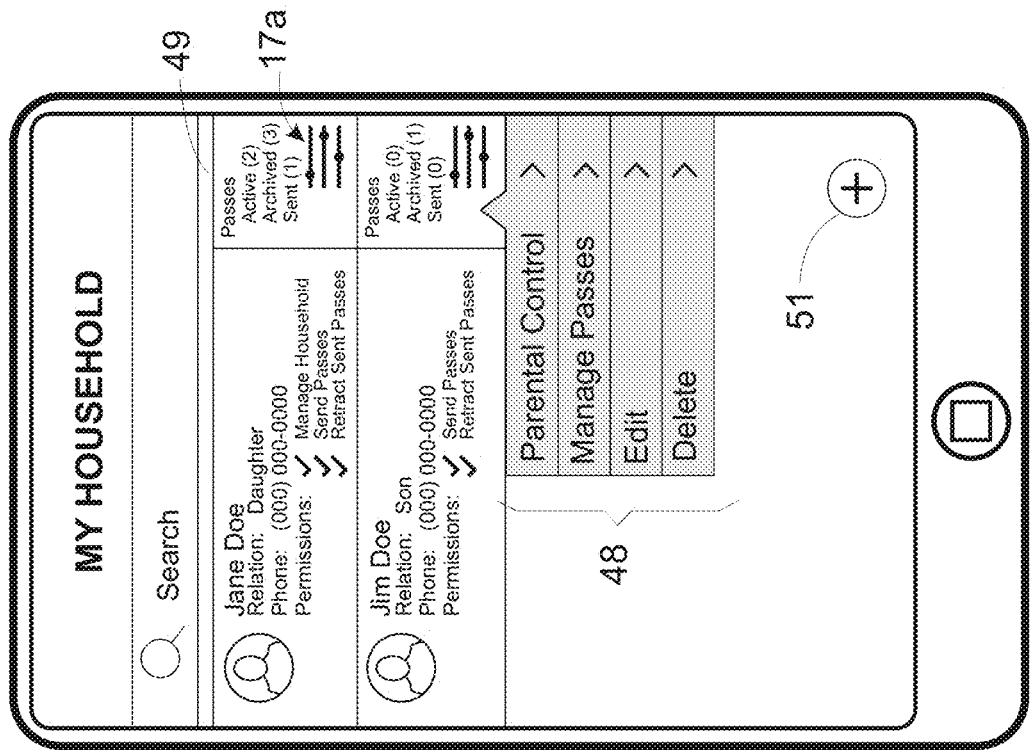
FIGS. 10-15 are exemplary schematic screen shots of the system and method of the invention showing certain features and functions accessible to a head-of-household resident member, enabling a predefined head-of-household to define, monitor, and manage the extent of individual household member usage of the system from respective household member devices, in accordance with at least some embodiments of the invention.
Figure 10:
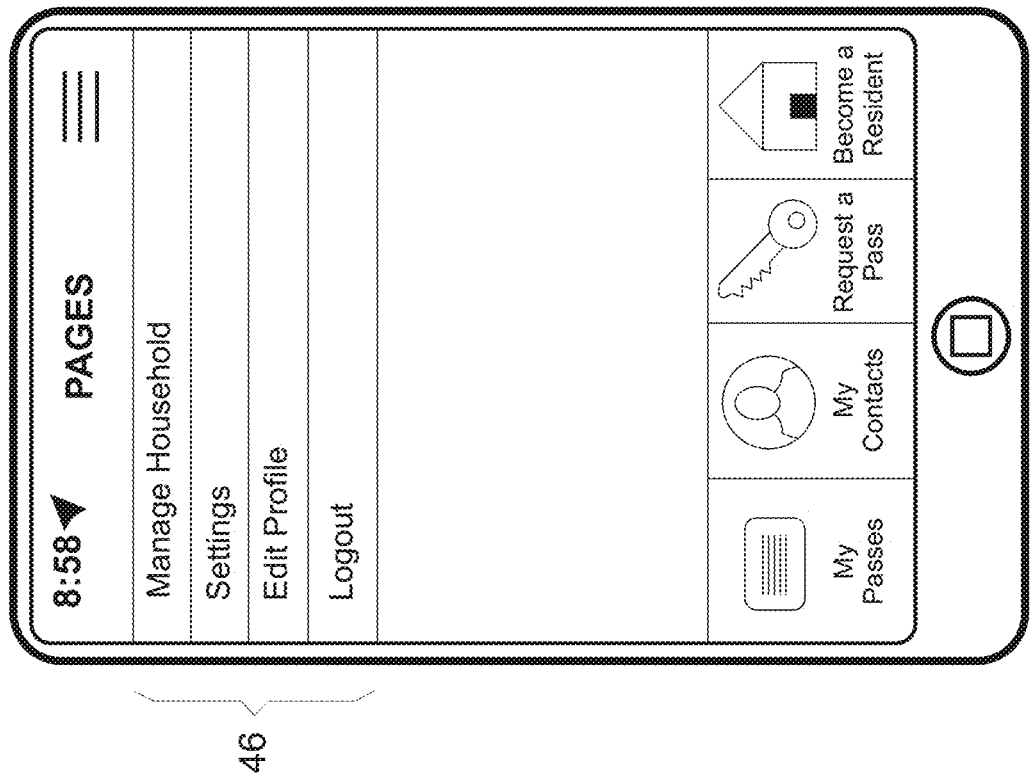
Figures 12, 13:
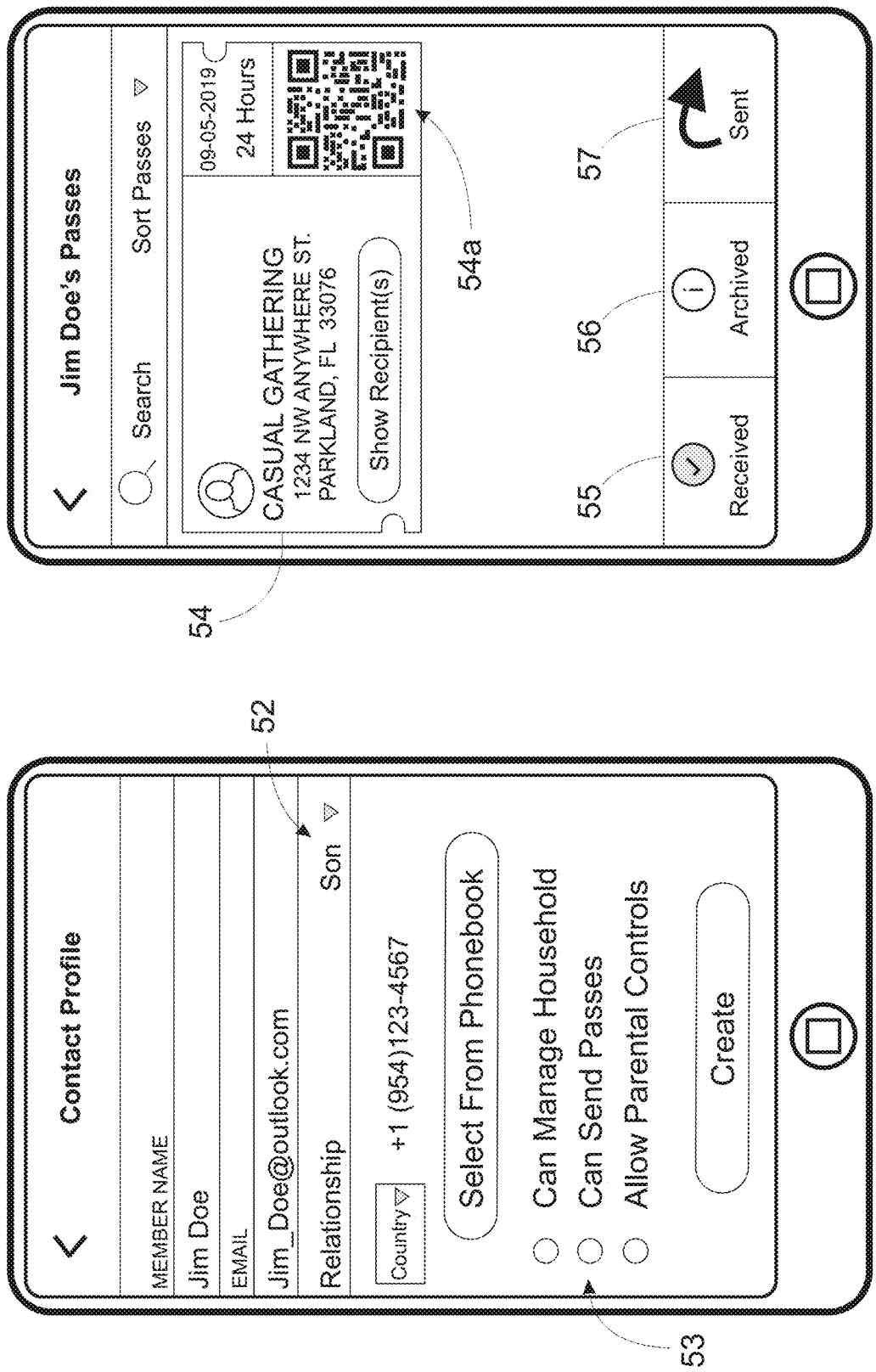

As best shown in FIG. 11, at step 124 (FIG. 3), selecting the Manage Household portion/area on the Pages screen toggles a previously-designated head-of-household member device to a My Household screen, where a designated head-of-household member may create and manage her household. The My Household screen displays a digital listing of household members 50, including, for example, each household member name, relationship to the head-of-household member (e.g. wife, husband, son, daughter, etc.), household member mobile device phone number, and household member current permissions (e.g. Manage Household, Send Passes, and Retract Sent Passes). The My Household screen may further include a Passes portion/area 49, listing and providing links to a selected household member's active, archived, and sent passes. Furthermore, via selection of a Small Navigation Menu icon 17a within the Passes area 49, a drop-down menu 48 is displayed, including, Parental Control, Manage Passes, Edit and Delete options. Via the edit and delete options, the head-of-household may edit a household member's profile or completely delete/remove a household member from My Household altogether. Via the Parental Controls option, the head-of-household member may customize parental controls for household members. Referring briefly to FIG. 12, selecting the Parental Controls option for a previously-selected household member toggles the head-of-household device to a Contact Profile screen for the selected household member where the head-of-household may edit the household member contact profile (e.g., member name, member email, member mobile device phone number, and member relationship 52 to the head-of-household), and/or select from a displayed list of household member permissions 53. Furthermore, from the My Household screen the head of household may add new household members via icon 51, which toggles to the Contact Profile screen (FIG. 12) as previously described.

Figure 14:
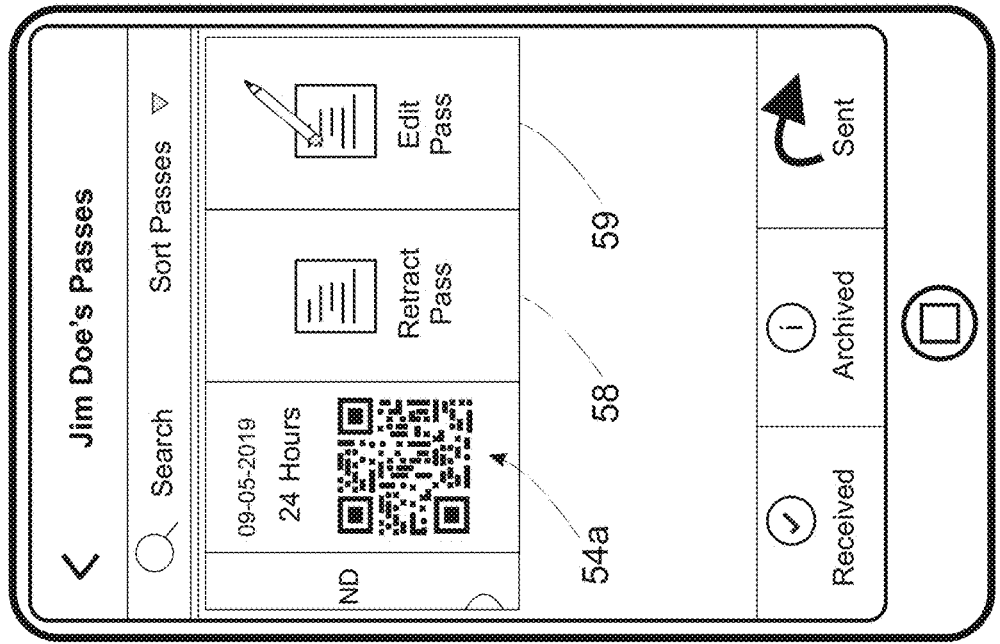

Referring now primarily to FIGS. 11 and 13-15, upon selecting the Manage Passes option from the My Household screen (FIG. 11) the head-of-household may view passes associated with a selected household member (FIG. 13). In particular, the head-of-household may view the selected household member's received 55, archived 56, and sent 57 passes. By selecting a household member pass 54, the system 18 displays details of a household member pass upon the head-of-household mobile device (FIG. 14). In effect, this option displays the selected household member's My Passes screen upon the head-of-household mobile device with full functionality, such that the head-of-household may, for example, select to retract 58 an active pass issued by the household member and/or edit pass 59 to modify an existing pass to the corresponding pass event (and, optionally, other pass event details such as event date and times). Subsequently, the system 18 updates the event details and communicates any such modified event updates to the mobile device(s) of one or more pass recipients.

Figure 15:
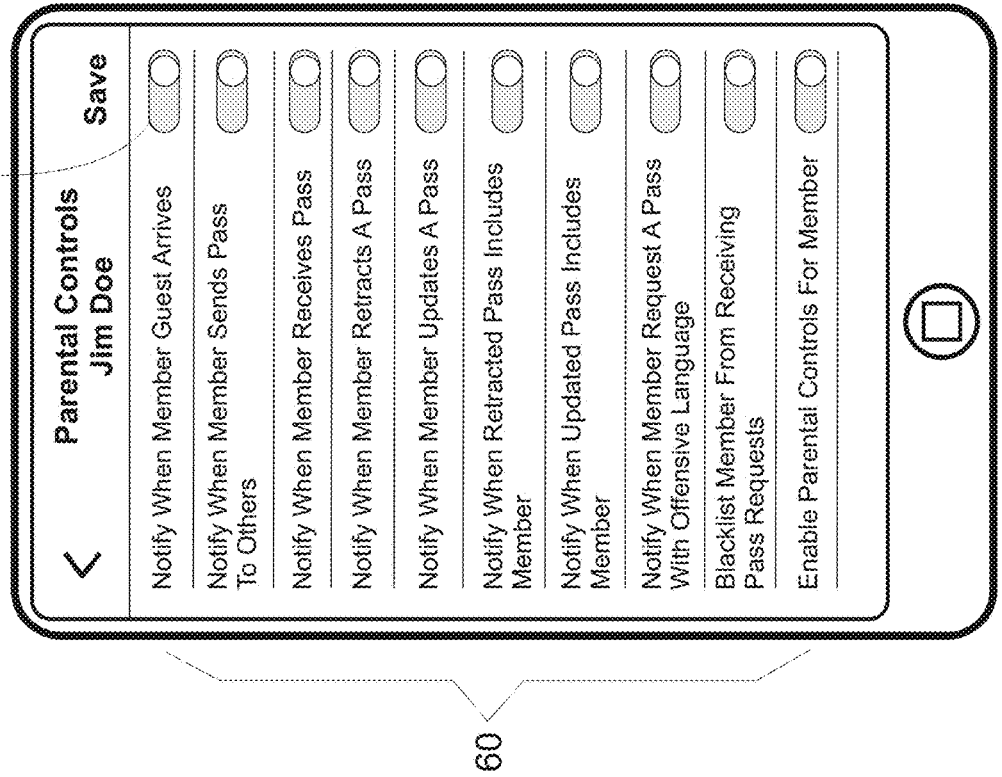

At step 126 (FIG. 3), for those household members with appropriate (i.e. Manage Household) permissions, notifications for each household member may be customized, enabling an authorized household member (e.g. mother/father) to monitor other household member (e.g. son/daughter) activity. As best shown in FIG. 15, the authorized household member (i.e. with appropriate permissions) may customize notifications (vis-à-vis each member of My Household) from a list of notifications 60, enabling an authorized household member to monitor selected activities 61 of specific household members. In this manner, the authorized household member (i.e. a household member previously granted Manage Household permissions) may choose to receive notifications when selected other household members pass-related activities occur (e.g., when a household member guest arrives for an event, when a household member sends a pass to others, when a household member receives, retracts, or updates a pass, and when a household member requests or sends a pass using system-defined offensive language). Moreover, the notification list 60 may include additional options such as, for example, blacklisting a household member from receiving pass requests, and enabling parental controls for another household member).

Figure 17:
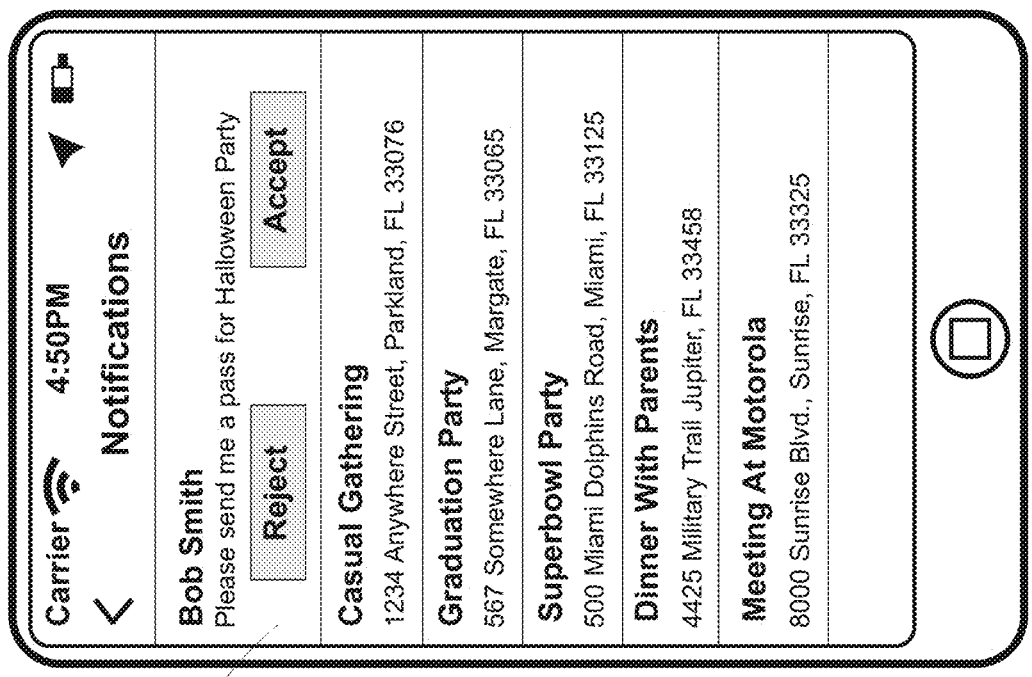
FIGS. 16-17 are exemplary schematic screen shots of the system and method of the invention, showing certain member notification features and functions.
Figure 16:
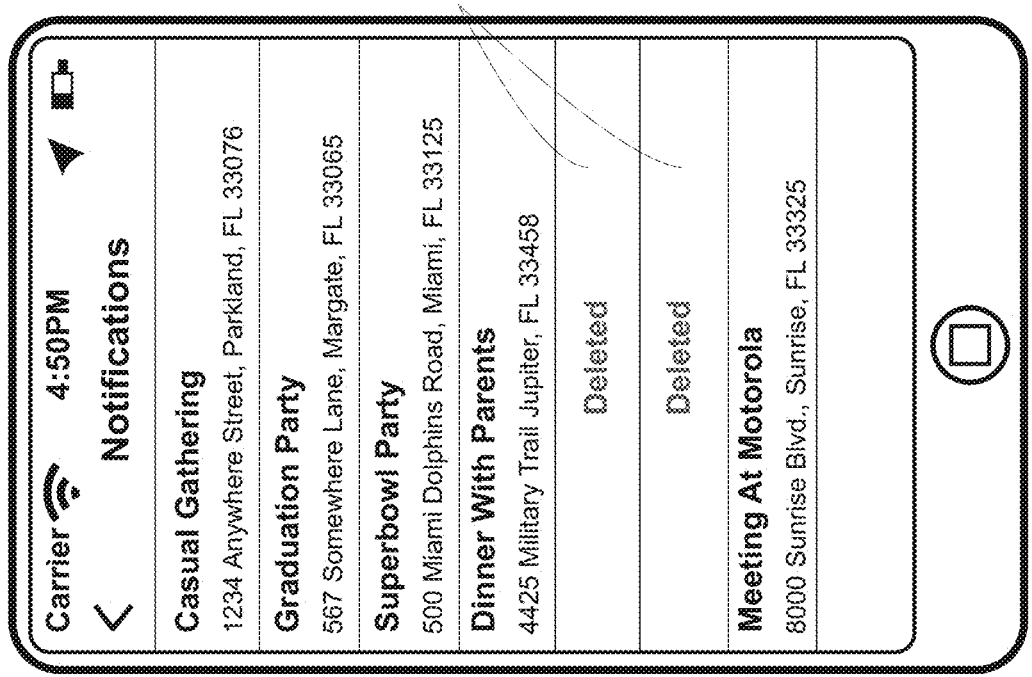
Figure 21:
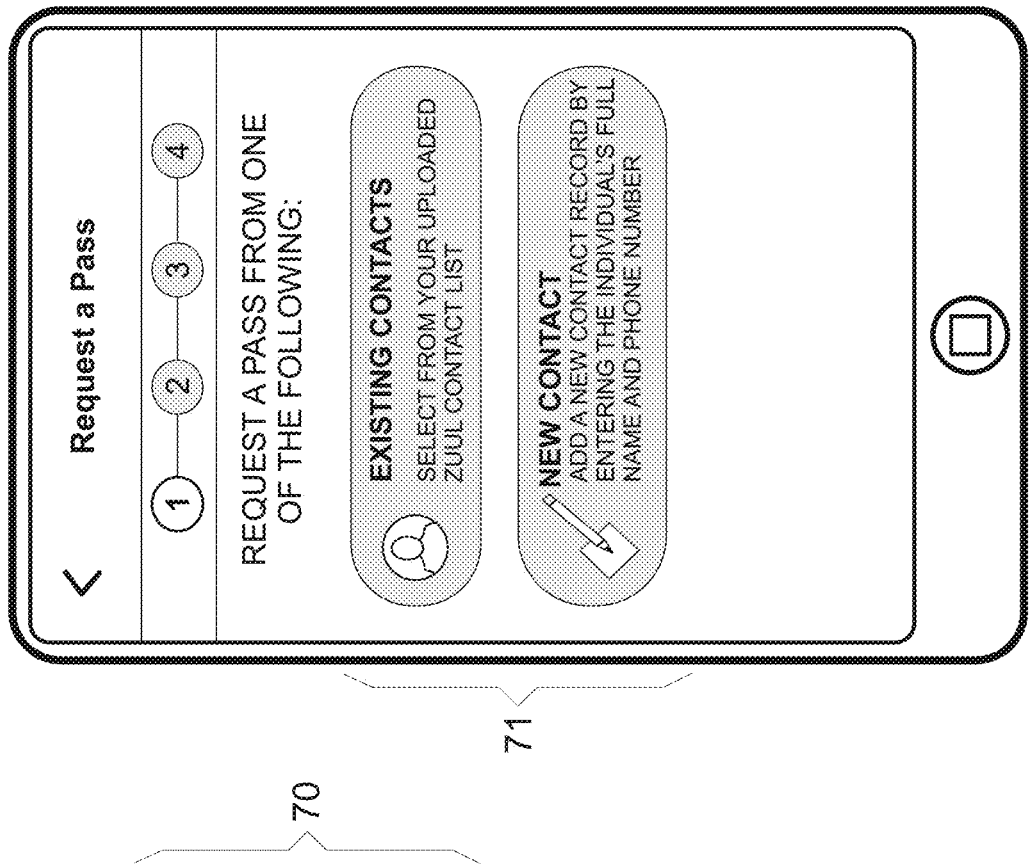
FIGS. 21-24 are exemplary schematic screen shots of the system and method of the invention showing various features and functions associated with a pass request process in accordance with at least some embodiments of the invention.

Referring particularly to FIG. 16, upon selecting the notification bell icon 36 on a system member device Dashboard page (FIGS. 8-9), a list of member notifications 62 is presented for viewing. Subsequently, the member may easily delete notifications 63 (e.g. by swiping them to the left on the mobile device screen). At step 128, a resident member may be notified of a pass request 64 initiated by another system member. At step 130, the resident member may either accept or reject the pass request. Referring particularly to FIG. 17, the pass request notification 64 generated by the pass-based community access management system 18 is communicated to the resident member mobile device along with options to either accept or reject the pass request. If the pass request is rejected by the resident member the process ends, at step 148. Alternatively, if the pass request is accepted, at step 130, the resident member mobile device screen automatically toggles to the Create a Pass function screen to initiate the generation of a customized digital guest pass, at step 132.

Referring now particularly to FIG. 18, in at least one embodiment of the present invention, a Pass Request/Pass Generation Module 30 (FIG. 2) of community access management system 18 (FIG. 1), gathers and organizes the following data and information to create the digital guest pass 54: a digital image of a guest member photo ID 34; event details 65, including, an event name, an event start date/time, and an event end date/time; sender information 66, including, a resident member sender name, sender phone number, and sender residential community name and address; and a unique optically-readable code—preferably, a Quick Response (QR) code 54a—generated by the system 18 and designed/configured to be directly read via the scanner functionality 16a of security guard device 16. Significantly, the digital pass 54 enables quick and efficient verification, on site, by a security guard at a designated community. In particular, the security guard may simply scan the QR code (or other scanner-readable code) using the scanner function 16a of the security guard mobile device 16 in order to verify whether the guest pass 54 is active and being presented during the resident-defined event date/time range. Moreover, the security guard may confirm that the displayed guest pass photo ID 34 is that of a person in the vehicle attempting entry into the community. The digital pass may further include icons enabling the pass recipient to add the pass sender information to the pass recipient's member contact list, to phone the sender, to get directions to the event address, and to add the event to a digital calendar application on the guest member device 14. Significantly, as a security measure, system 18 organizes and combines the aforementioned digital pass information such that the digital image of the pass recipient photo ID 34 and the QR code 54a are not capable of being simultaneously displayed on the screen of a pass recipient mobile device. In this manner, a pass recipient is precluded from attempting to take a screen shot of a pass and then forwarding the screen shot copy to a non-recipient party. Instead, the recipient would be required to take two separate screen shots, raising a red flag with the security guard during a pass verification process.

Referring back to FIG. 13, after authorizing the issuance of a customized digital pass, an issuing resident may, from a Sent Passes Contacts screen (not shown), elect to retract an active pass, at step 134, as previously described with respect to the My Household functionality. If a pass is retracted by selecting a Retract Pass icon 58 (FIG. 14), the pass will be immediately deactivated (i.e. if it was currently active) and preferably deleted entirely from the system; accordingly, none of the pass recipients will continue to hold a valid pass. Where there are multiple recipients of a pass, the pass issuer may elect to retract the pass for one or more selected recipients by simply swiping each respective individual recipient pass (e.g., to the right). In any event, if a particular pass recipient's pass is retracted, the process vis-à-vis that pass recipient, ends at step 148. Alternatively, a pass-issuing member may elect to change pass details (e.g. pass effective dates/times, event location, etc.), at step 136.

Figure 29:
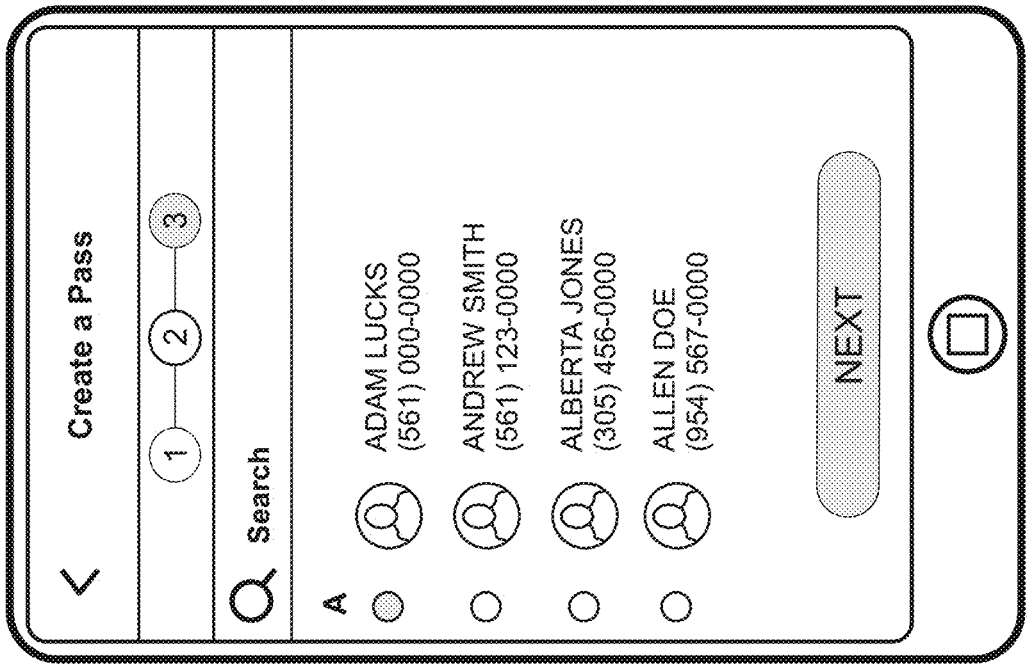
FIGS. 28-30 are exemplary schematic screen shots of the system and method of the invention, showing various features and functions associated with a pass creation process in accordance with at least some embodiments of the invention.
Figure 28:
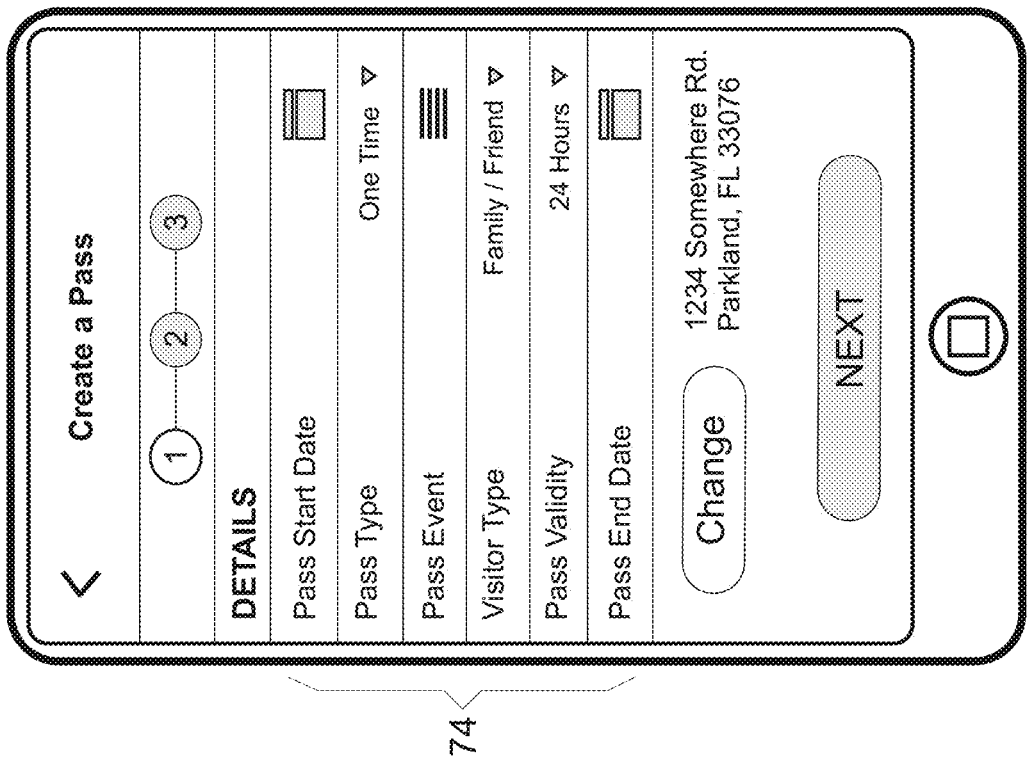

A resident member may, via resident mobile device 12, issue unsolicited passes (i.e., to invite a nonresident guest member to enter the community), as well as issue solicited passes in response to pass requests received from nonresident guest mobile devices 14. At step 138 (FIG. 3), the pass issuer may modify details of an active pass. Referring now briefly to FIGS. 26-29, from the respective resident member's mobile device My Passes screen the pass issuer may select the View Details icon 58 or Edit Pass icon 59 for the selected pass 54, which toggles the resident member mobile device to display a pass Details screen (such as that shown in FIG. 28, also used during the pass creation process). From this screen, the pass issuer may elect to change one or more pass details 74, including: Pass Start Date, Pass End Date, Pass Type (e.g. one-time passes and multiple use passes), Pass Event name, Visitor Type (e.g. Family/Friend, Contractor, etc.), and Pass Validity (e.g. 6 hours, 12 hours, 2 days, 1 week, etc.). Subsequently, the pass issuer selects one or more member contacts to which the pass is intended to be sent (FIG. 29). Furthermore, the pass issuer may select a Change icon to update an event location address. At step 140 (FIG. 3), the pass issuer may further elect to add pass recipients to an active pass, in which case the pass issuer mobile device is toggled to a Pass Recipients screen where the pass issuer may select additional member contacts to add to the list of pass recipients, in accordance with step 142. In similar fashion, at step 144 (FIG. 3), the pass issuer may further elect to delete one or more pass recipients from an active pass, in which case the pass issuer mobile device is toggled to a Pass Recipients screen where the pass issuer may select existing pass recipient member contacts to delete from the list of current pass recipients, in accordance with step 146. Subsequently, unless the user prefers to take any other action the process ends at step 148.

Figure 20:
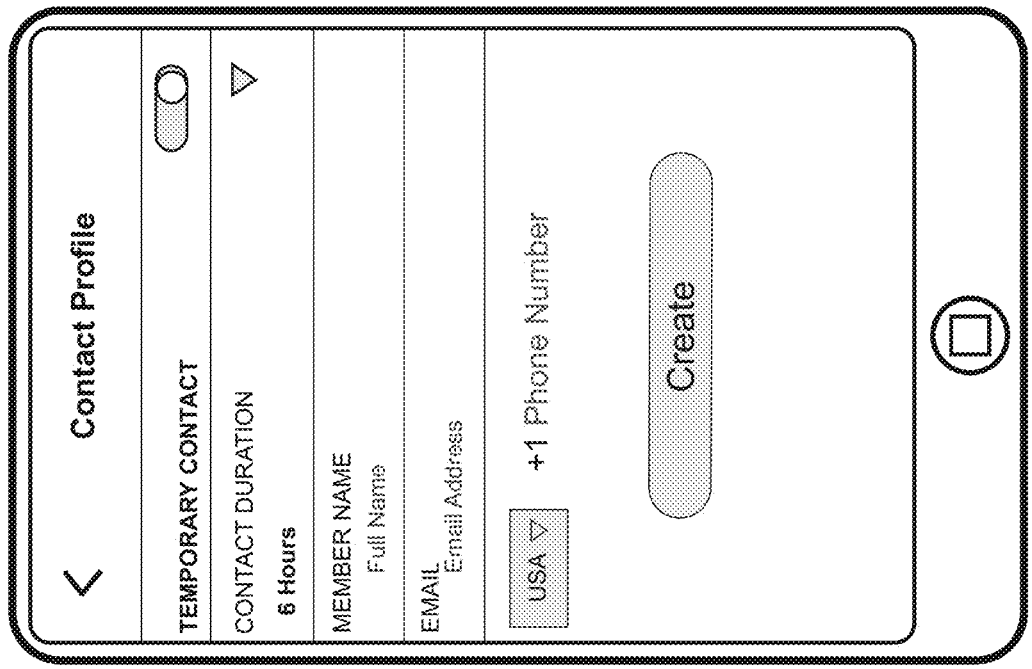

Referring now briefly to FIG. 19, from a registered system member's mobile device My Contacts screen a member may select from a list of individual member contacts 67 (or alternatively from a list of groups of member contacts, via the Groups tab) and then select from a drop down menu of options 68, including options to: Send a Pass to the selected contact; Call the selected contact; Edit the selected contact; Add the selected contact to a contact group via an Add to Group function; Add the selected contact to a Favorite Contacts list via the Add to Favorites function, and Delete Contact. Moreover, a registered system member may easily add a new member contact to the My Contacts list using the "+" (i.e. add contacts) icon 69. Referring briefly to FIG. 20, via a contact area 70 of a member device Contact Profile page, an individual contact may be set as a Temporary Contact for a limited time period, via a user Contact Duration function.

Figure 23:
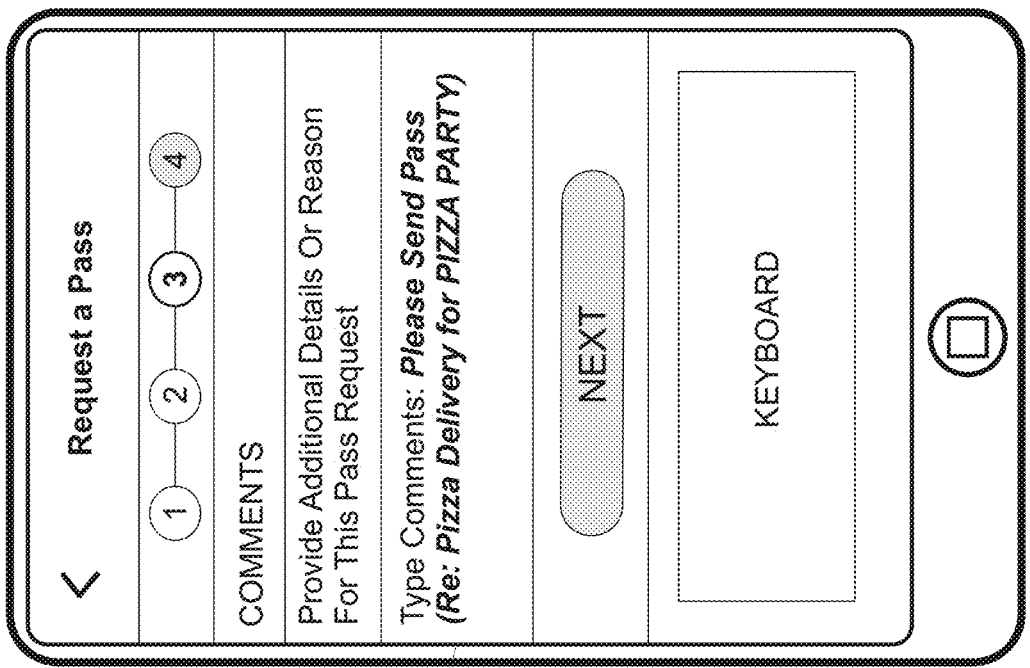
Figure 22:
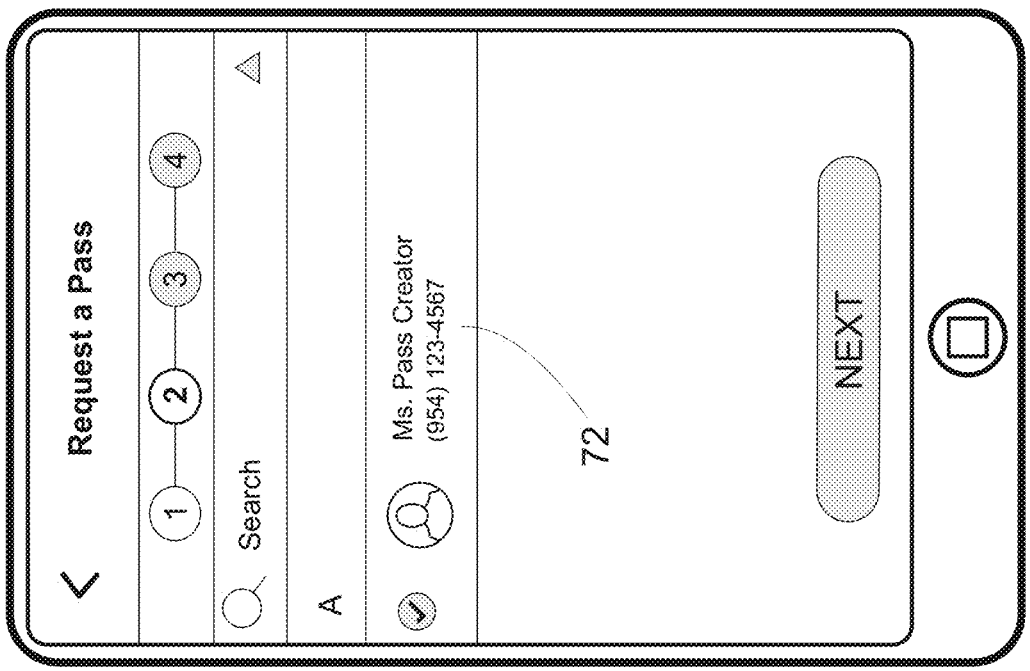

Referring now primarily to FIGS. 21-24, the Request a Pass process will now be described in greater detail. Initially, a pass-requesting member selects from a pair of icons 71 (FIG. 21) to either select a resident member (i.e., from whom to request a pass) from an Existing Contacts list, or to add a New Contact to an existing contact list (i.e. from whom to request a pass). Subsequently, in the former case, the pass-requesting member selects a particular resident member 72 (FIG. 22) from whom to request a pass. Then, the pass-requesting member is prompted to type comments 73 to be organized and combined with other pass request details by system 18 in order to form a digital pass request (FIG. 23). In particular, the requesting party is prompted to provide a reason for the requested pass. For example, in the case of a pizza delivery person, the delivery person may enter "Pizza Party." If the pass request is successful, a screen to that effect is displayed on the requesting party's mobile device (FIG. 24), and an active pass 54 is displayed (FIG. 25) on the My Passes screen of the requesting party's mobile device 14. As described previously herein, from the My Passes screen the requesting party may toggle between Received, Sent, Archived, and Scanned pass lists.

Figure 31:
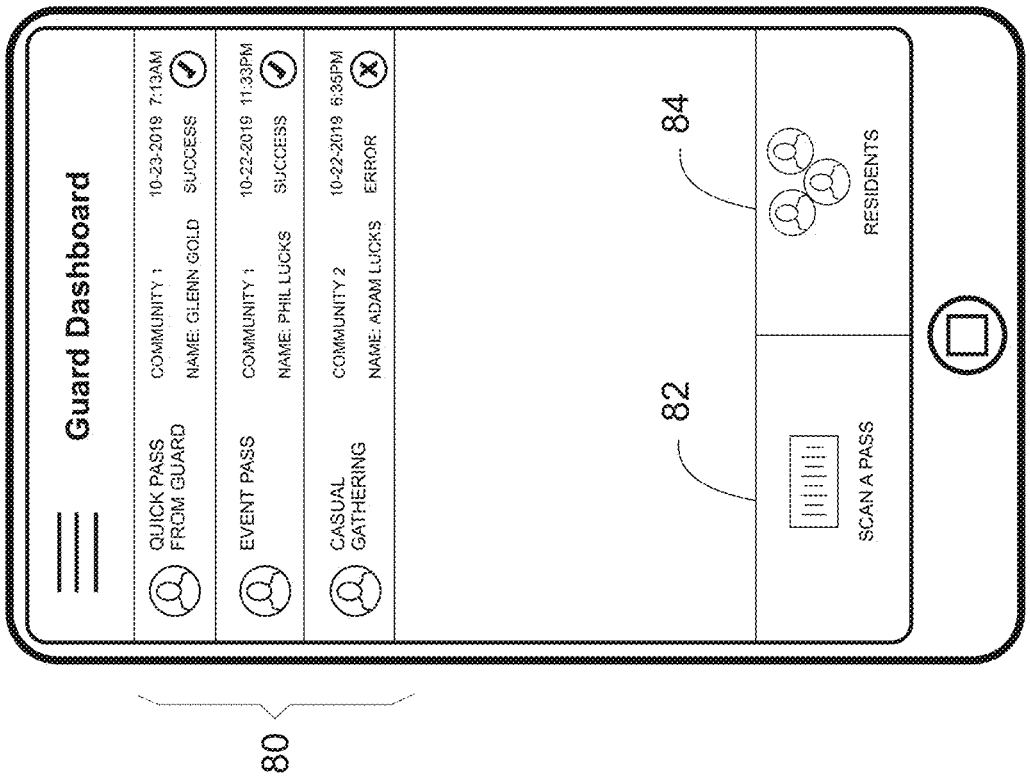
FIG. 31-32 are exemplary screen shots of the system and method of the invention, showing various features and functions accessible from a security guard device, in accordance with at least some embodiments of the invention.
Figure 30:
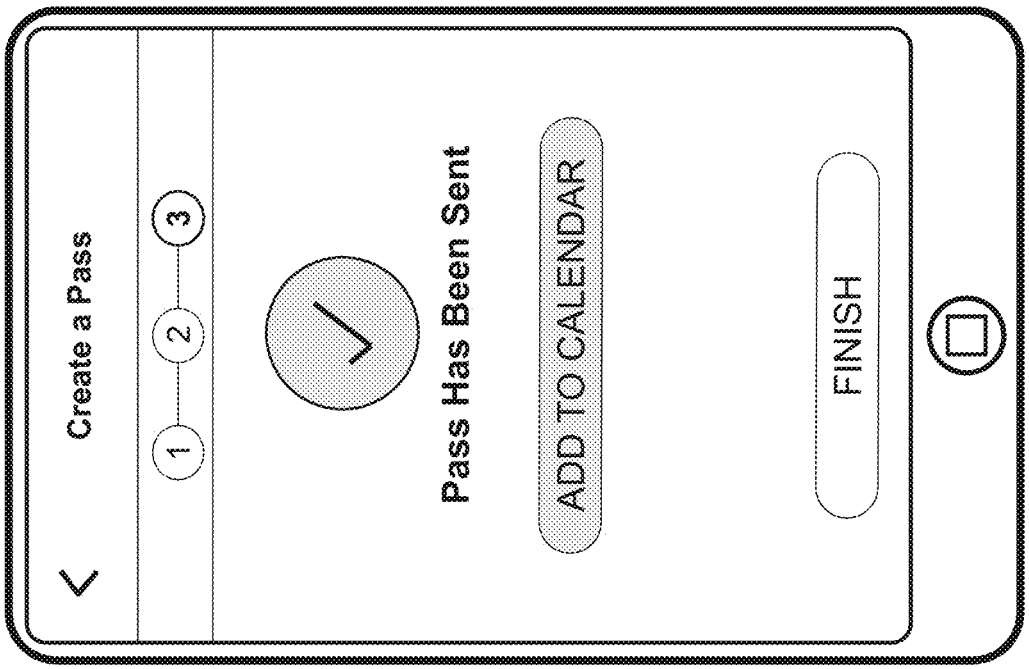
Figure 32:
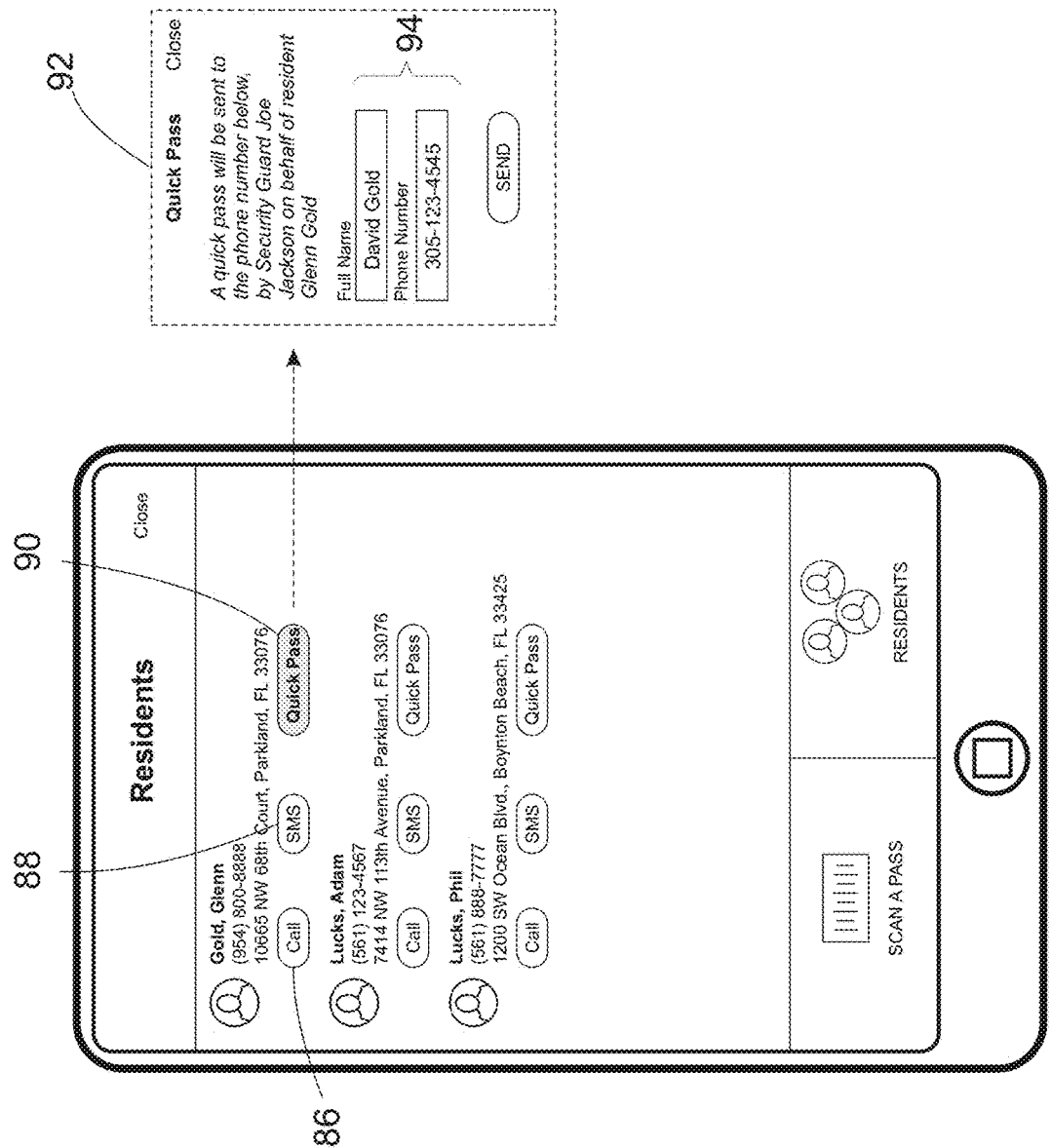

Referring now to FIGS. 31-32, a guard dashboard viewable upon security guard mobile device 16 may include a list of passes 80 that have been scanned via the Scan a Pass icon 82 of the security guard mobile device. Each listed pass may include: a name of the corresponding pass-related event or, alternatively, text that the pass was issued by the guard as a "Quick Pass," in lieu of listing an event; a particular community; the name of a pass issuer; the date and time that the pass was scanned; and whether the scan process was successful or, alternatively, an error message resulted (e.g. due to the pass being inactive). From this screen the security guard may further select a "Residents" icon 84, in order to display a list of resident members of the respective community from which the security guard may select a Call icon 86 to directly phone the resident mobile device 12, an SMS icon 88 to send an SMS message directly to the resident's mobile device, or a Quick Pass icon 90 to have the system 18 generate a Quick Pass details screen 92 communicated to and displayed upon the security guard mobile device 16, in order to send to a mobile device associated with an intended recipient name and mobile device phone number 94 on behalf of the selected resident.

Figure 37:

Referring now generally to FIGS. 33-43, various interactive system backend screens are depicted. In FIG. 33, a User List screen is shown from which a system administrator may view and modify details pertaining to system guest members, as well as create new guest system users. In FIG. 34, a User List screen is shown from which a system administrator may view and modify details pertaining to system resident household members, as well as create new system resident household members. In FIG. 35, a User List screen is shown from which a system administrator may view and modify details pertaining to system security guards, as well as create new security guard system users. In FIG. 36, a Roles List screen is shown from which a system administrator may view and modify details pertaining to defined system user roles, as well as create new system user roles. In FIG. 37, a Community List screen is shown from which a system administrator may view and modify details pertaining to system participating communities, as well as create new system communities. In FIG. 38, a House List screen is shown from which a community administrator may view and modify details pertaining to individual resident homes within a specific community, as well as create new resident homes within the respective community. In FIG. 39, a Sent Passes List screen is shown from which a community administrator may view and modify details pertaining to individual passes sent by community residents. In FIG. 40, a Guest Log screen is shown from which a community administrator may view and modify details of individual ones of a list of community previously scanned guest passes. In FIG. 41, a Pass Request Log screen is shown from which a community administrator may view and modify details of individual pending passes from a list of passes requested by nonresidents, of residents, of a community. In FIG. 42, from an Admin Guide screen, a system administrator (and, optionally, a community administrator) may view vehicle RFID information for residents of system communities, as well as initiate the creation of new community resident RFID entries. In FIG. 43, from an Admin Guide screen, a system administrator may track the RFID activity of resident vehicles of participating system communities.

In an alternative embodiment of the invention, QR code (e.g. in the form of a printed sticker) may be located in proximity to a gated community entrance to enable a non-member, or new user, without an issued pass to become a system member and subsequently request a pass. In that case, the nonmember may scan the QR code using her mobile phone, which will bring her to a system website to go through the member registration process as previously described herein. Upon becoming a system member, the new user may request a pass from a resident member and, upon receiving a resident-authorized digital pass, gain access to the resident community.

In a further alternative embodiment, a digital pass may be implemented for use by residents of a community in order to gain access to particular community facilities. In this manner, the digital pass QR code further functions as a resident mobile device key.

Since many modifications, variations, and changes in detail can be made to describe preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method for providing resident-controlled, verified nonresident admission to a gate attendant monitored access gate controlled community location, the access gate directly operatively controlled by the gate attendant, the method comprising:

communicating, from a resident mobile device to a pass-based remote access control management system, resident authorization to generate and communicate a digital access pass to a nonresident guest mobile device for admission of the nonresident guest into the access gate controlled community location, the pass-based remote access control management system including a computer processor, a memory device, a communication device, data storage, a member registration module, and a pass request/pass generation module;

generating, at the remote access control management system, a customized digital access pass comprising a digital image of a nonresident guest photo ID, resident-defined nonresident guest access time parameters, resident contact and community location information, and a unique optically-readable code generated by the access control management system and associated with the nonresident guest photo ID, the resident-defined access time parameters, and the resident contact and community location information, the generated digital access pass in the form of a unitary digital access pass image particularly configured such that the digital image of the nonresident guest photo ID and the digital image of the unique optically-readable code cannot be simultaneously displayed on the nonresident guest mobile device;

transmitting the generated digital access pass from the remote access control management system to the nonresident guest mobile device, the remote access control management system storing the digital access pass data in a system database, the digital access pass data remotely accessible and manageable from the resident mobile device;

displaying the digital access pass on the nonresident guest mobile device; and scanning the unique optically-readable code, by the gate attendant, at the access gate controlled community location in order to verify nonresident guest admission thereto without requiring communication of nonresident guest mobile device location information from the nonresident mobile device to the remote access control management system, wherein, upon verifying nonresident guest admission by the gate attendant, nonresident guest access to the community location is granted via toggling of the access gate, by the gate attendant, from a closed position to an opened position.

2. The method recited in claim 1, further comprising, prior to the step of communicating resident authorization, a step of:

receiving a request at the resident mobile device, from the nonresident guest mobile device, for a digital access pass enabling nonresident guest admission into the access gate controlled community location.

3. The method recited in claim 2, wherein the step of scanning further comprises scanning the unique optically-readable code via a gate attendant mobile device in order to verify nonresident guest access to the access gate controlled community location.

4. The method recited in claim 2, further comprising, prior to the step of receiving a request at the resident mobile device for a digital access pass, a step of:

registering the nonresident mobile device with the pass-based remote access control management system.

5. The method recited in claim 2, further comprising, after the step of receiving a request at the resident mobile device, from the nonresident guest mobile device, for a digital access pass enabling nonresident guest admission into the access gate controlled community location, steps of:

determining, by the pass-based community access management system, whether the nonresident guest is an existing nonresident member of the system; and upon determining, by the system, that the nonresident guest is not an existing nonresident member of the system, requiring the nonresident guest to register to become a nonresident member of the system.

6. The method recited in claim 1, wherein the step of scanning further comprises scanning the unique optically-readable code via a gate attendant mobile device in order to verify nonresident guest access to the access gate controlled community location.

7. The method recited in claim 1, further comprising, after the step of transmitting the generated digital access pass from the remote access control management system to the nonresident guest mobile device, a step of:

modifying at least one nonresident guest access parameter defined by the generated digital access pass via communicative interaction between the resident mobile device and the remote access control management system.

8. The method recited in claim 1, further comprising, after the step of transmitting the generated digital access pass from the remote access control management system to the nonresident guest mobile device, a step of:

retracting the generated digital access pass, by the resident, via communicative interaction between the resident mobile device and the remote access control management system.

9. The method recited in claim 1, wherein the step of generating a digital access pass further comprises said computer processor functioning to gather, and subsequently organize, the digital image of a nonresident photo ID, the resident-defined time parameters, the resident contact and community location information, and the unique optically-readable code generated by the access control management system into a unitary digital access pass image.

10. The method recited in claim 1, further comprising, prior to the step of generating a digital pass at the remote access control management system, steps of:

determining, by the pass-based community access management system, whether the resident is an existing resident member of the system; and upon determining, by the system, that the resident is not an existing resident member, requiring the resident to register to become a system resident member via communication, from the resident mobile device, with a member registration module of the system.

11. The method recited in claim 10 wherein, upon completing a resident member registration process, the resident is provided with communicative access to the remote access control management system.

12. The method recited in claim 11 wherein said communication access enables the resident, via a resident member system dashboard displayed on the resident mobile device, to establish and control a resident-specific database of nonresident members of the system, and to selectively create and modify one or more digital access passes associated with the resident-specific database of nonresident members of the system.

13. The method recited in claim 12 wherein said communication access enables a subset of resident members defined by the system as head-of-household resident members to control, via the resident member mobile device dashboard, one or more databases of nonresident system members associated with one or more corresponding non head-of-household resident members, and to selectively control digital access passes associated therewith.

* * * * *